United States Patent
Kerlau et al.

(10) Patent No.: US 9,735,431 B2
(45) Date of Patent: Aug. 15, 2017

(54) REINFORCED CURRENT COLLECTING SUBSTRATE ASSEMBLIES FOR ELECTROCHEMICAL CELLS

(71) Applicant: Nexeon Limited, Abingdon (GB)

(72) Inventors: Marie Kerlau, Saratoga, CA (US); Madhuri Thakur, Fremont, CA (US)

(73) Assignee: Nexeon Limited (GB)

( * ) Notice: Subject to any disclaimer, the term of this patent is extended or adjusted under 35 U.S.C. 154(b) by 148 days.

(21) Appl. No.: 14/514,678

(22) Filed: Oct. 15, 2014

(65) Prior Publication Data

US 2015/0104712 A1    Apr. 16, 2015

Related U.S. Application Data

(60) Provisional application No. 61/891,237, filed on Oct. 15, 2013.

(51) Int. Cl.
*H01M 2/26* (2006.01)
*H01M 4/70* (2006.01)
(Continued)

(52) U.S. Cl.
CPC ............. *H01M 4/70* (2013.01); *H01M 4/045* (2013.01); *H01M 4/13* (2013.01); *H01M 4/364* (2013.01);
(Continued)

(58) Field of Classification Search
CPC ......... H01M 10/052; H01M 2004/021; H01M 2004/027; H01M 4/0404; H01M 4/045;
(Continued)

(56) References Cited

U.S. PATENT DOCUMENTS 5,229,228 A    7/1993   Doniat et al.
5,824,120 A    10/1998  Mitchell et al.
(Continued)

FOREIGN PATENT DOCUMENTS

| EM | 2590251 A2 | 5/2013 |
| EP | 0461047 A1 | 12/1991 |
| FR | 2755795 A1 | 5/1998 |
| FR | 2944149 A1 | 10/2010 |
| JP | 2004281317 A | 10/2004 |

OTHER PUBLICATIONS

Kerlau, Marie et al., "Reinforced Current Collecting Substrate Assemblies for Electrochemical Cells", International Application Serial No. PCT/EP2014/072166, filed Oct. 15, 2014, 76 pgs.
(Continued)

*Primary Examiner* — Patrick Ryan
*Assistant Examiner* — Ben Lewis
(74) *Attorney, Agent, or Firm* — Kwan & Olynick LLP

(57) ABSTRACT

Provided is a current collecting assembly for use in an electrochemical cell. In some embodiments, the current collecting assembly comprises a current collecting substrate having a first side defining a first surface, and a second side defining a second surface. Each of the first and second surfaces defines a surface area. The current collecting assembly further comprises a first assembly of reinforcing structures disposed on and attached to the first side of the current collecting substrate. The current collecting substrate comprises a conductive material. The first assembly of reinforcing structures comprises a first set of reinforcing structures. The first set of reinforcing structures comprises a first polymer material. The first assembly of reinforcing structures mechanically reinforces the current collecting substrate.

21 Claims, 12 Drawing Sheets

(51) Int. Cl.

| | |
|---|---|
| *H01M 4/66* | (2006.01) |
| *H01M 4/13* | (2010.01) |
| *H01M 4/36* | (2006.01) |
| *H01M 4/38* | (2006.01) |
| *H01M 4/587* | (2010.01) |
| *H01M 4/62* | (2006.01) |
| *H01M 4/64* | (2006.01) |
| *H01M 4/04* | (2006.01) |
| *H01M 4/02* | (2006.01) |
| *H01M 4/1395* | (2010.01) |
| *H01M 10/052* | (2010.01) |

(52) U.S. Cl.
CPC ............ *H01M 4/38* (2013.01); *H01M 4/587* (2013.01); *H01M 4/626* (2013.01); *H01M 4/64* (2013.01); *H01M 4/661* (2013.01); *H01M 4/667* (2013.01); *H01M 4/668* (2013.01); *H01M 4/0404* (2013.01); *H01M 4/1395* (2013.01); *H01M 4/625* (2013.01); *H01M 10/052* (2013.01); *H01M 2004/021* (2013.01); *H01M 2004/027* (2013.01)

(58) Field of Classification Search
CPC ...... H01M 4/13; H01M 4/1395; H01M 4/364; H01M 4/38; H01M 4/587; H01M 4/625; H01M 4/626; H01M 4/64; H01M 4/661; H01M 4/667; H01M 4/668; H01M 4/70; Y02E 60/122
See application file for complete search history.

(56) References Cited

U.S. PATENT DOCUMENTS

| | | | |
|---|---|---|---|
| 7,402,829 | B2 | 7/2008 | Green |
| 8,101,298 | B2 | 1/2012 | Green et al. |
| 2006/0068294 | A1* | 3/2006 | Mraz ................... H01M 2/1613 429/302 |
| 2008/0261112 | A1 | 10/2008 | Nagata et al. |
| 2009/0239151 | A1* | 9/2009 | Nakanishi ........... H01M 4/0428 429/231.95 |
| 2010/0190061 | A1 | 7/2010 | Green |
| 2010/0285358 | A1 | 11/2010 | Cui et al. |
| 2010/0297502 | A1 | 11/2010 | Zhu et al. |
| 2011/0067228 | A1 | 3/2011 | Green |
| 2011/0250498 | A1 | 10/2011 | Green et al. |
| 2011/0250500 | A1* | 10/2011 | Ho .......................... H01M 4/14 429/226 |
| 2011/0269019 | A1 | 11/2011 | Green et al. |
| 2011/0274969 | A1* | 11/2011 | Wang .................... H01M 4/661 429/210 |
| 2012/0132859 | A1 | 5/2012 | Lestriez et al. |
| 2013/0095367 | A1 | 4/2013 | Kim |

OTHER PUBLICATIONS

Lahlouh, John et al., "Surface Treated Silicon Containing Active Materials for Electrochemical Cells", U.S. Appl. No. 14/093,666, filed Dec. 2, 2013, 37 pgs.

"Int'l Application Serial No. PCT/EP2014/072166, Search Report and Written Opinion mailed Feb. 4, 2015", 10 pgs.

* cited by examiner

REINFORCED CURRENT COLLECTING SUBSTRATE ASSEMBLIES FOR ELECTROCHEMICAL CELLS

CROSS-REFERENCE TO RELATED APPLICATIONS

This application claims the benefit under 35 U.S.C. §119 (e) of U.S. Provisional Patent Application 61/891,237, entitled: "Reinforced Current Collecting Substrate Assemblies for Electrochemical Cells" filed on Oct. 15, 2013, which is incorporated herein by reference in its entirety

INTRODUCTION

The present disclosure relates to current collectors for electrochemical cells, more specifically to current collectors for lithium ion batteries, to electrodes including these current collectors, to methods of manufacturing both the current collectors and electrodes including these current collectors, to batteries including the current collectors and to devices including these batteries.

BACKGROUND

Rapid development of mobile electronics, electrical vehicles, medical devices, and other like application demands high capacity rechargeable batteries that are light and small. Lithium ion technology presented some advancement in this area in comparison, for example, to lead-acid and nickel metal hydride batteries. However, to date, lithium ion cells are mainly built with graphite as a negative active material. Graphite's theoretical capacity is 372 mAh/g, and this fact inherently limits further improvement.

Silicon, germanium, tin, and many other materials are potential candidates for replacement of graphite because of their high lithiation capacities. For example, silicon has a theoretical capacity of about 4200 mAh/g, which corresponds to the $Li_{4.4}Si$ phase. Yet, adoption of these high capacity materials is limited in part by substantial changes in volume during their cycling. For example, silicon expands by as much as 400% when charged to its theoretical capacity. Volume changes of this magnitude can cause significant mechanical stresses in electrode, resulting in fractures and pulverization of active materials, losses of electrical and mechanical connections within the electrode, and capacity fading. Furthermore, these stresses can wrinkle and/or rip the current collecting substrate causing deterioration of cell performance.

SUMMARY

Provided is a current collecting assembly for use in an electrochemical cell. In some embodiments, the current collecting assembly comprises a current collecting substrate having a first side defining a first surface, and a second side defining a second surface. Each of the first and second surfaces defines a surface area. The current collecting assembly further comprises a first assembly of reinforcing structures disposed on and attached to the first side of the current collecting substrate. The current collecting substrate comprises a conductive material. The first assembly of reinforcing structures comprises a first set of reinforcing structures. The first set of reinforcing structures comprises a first polymer material. Whereby the first assembly of reinforcing structures mechanically reinforces the current collecting substrate.

In some embodiments, the first assembly of reinforcing structures extends over the first surface of the current collecting substrate and covers less than 40% of a surface area of the first surface or, more specifically, less than 10% of the surface area of the first surface. The first set of reinforcing structures may have an average height of between 0.5 micrometers and 5 micrometers. In some embodiments, the first assembly of reinforcing structures comprises structures having an average width of between 0.5 micrometers and 5 micrometers.

The reinforcing structures in the first set may be arranged in a rectangular grid. A portion of these reinforcing structures may be parallel to each other and are perpendicular to remaining structures. In some embodiments, reinforcing structures in the first assembly are arranged in a rectangular grid. A portion of the reinforcing structures may be parallel to each other and are perpendicular to remaining structures. In some embodiments, reinforcing strands of the first set of reinforcing structures are randomly orientated. More generally, reinforcing strands of the first assembly of reinforcing structures are randomly orientated.

In some embodiments, the first polymer material comprises one or more polymers selected from group consisting of polyaniline, polypyrrole, polyparaphenylene, polyparaphenylene sulphide, polyparavinylene, polythiophene, polyparaphenylene terephthalamide, nylon, polyisothionaphthalene, and polyacrylonitrile.

In some embodiments, the current collecting assembly also includes a second assembly of reinforcing structures disposed on and attached to the second surface of the current collector. The second assembly of reinforcing structures comprises a second set of reinforcing structures comprising a second polymer material. The second assembly of reinforcing structures mechanically reinforces the current collecting substrate. In some embodiments, the second polymer material is different from the first polymer material. Alternatively, the second polymer material is the same as the first polymer material.

In some embodiments, the first assembly of reinforcing polymer structures comprises a third set of reinforcing structures. The third set of reinforcing structures comprises a third polymer material. The third polymer material is selected from one or more polymers selected from the group consisting of polyaniline, polypyrrole, polyparaphenylene, polyparaphenylene sulphide, polyparavinylene, polythiophene, poly paraphenylene terephthalamide, nylon, polyisothionaphthalene, and polyacrylonitrile. The first set of reinforcing structures may intersect with the third set of reinforcing structures at multiple points over the first surface of the current collecting substrate.

In some embodiments, the first assembly of reinforcing structures comprises a rectangular grid. Reinforcing structures in a portion of the first assembly of reinforcing structures are parallel to each other and perpendicular to other reinforcing structures in the first assembly of reinforcing structures. The first set of reinforcing structures and the third set of reinforcing structures are alternately arranged in perpendicular and parallel directions.

In some embodiments, the second assembly of reinforcing polymer structures comprises a fourth set of reinforcing structures, The fourth set of reinforcing structures comprises a fourth polymer material. The fourth polymer material may be same as the third polymer material. The second set of reinforcing structures intersects with the fourth set of reinforcing structures at multiple points over the surface of the current collecting substrate.

In some embodiments, the second assembly comprises a rectangular grid. A portion of reinforcing structures in the first assembly of reinforcing structures may be parallel to each other and perpendicular to other reinforcing structures in the first assembly of reinforcing structures. The second set of reinforcing structures and the fourth set of reinforcing structures are alternately arranged in perpendicular and parallel directions.

In some embodiments, the position of the reinforcing structures in the second assembly of reinforcing structures co-insides with the position of the reinforcing structures of the first assembly of reinforcing structures. Alternatively, the reinforcing structures of the first assembly of reinforcing structures and the second assembly of reinforcing structures may be arranged into rectangular grids having corners and rectangular elements each identified with four corners. The corners of the first assembly of reinforcing structures co-inside with centers of the rectangular elements of the second assembly of reinforcing structures.

In some embodiments, various examples of the current collecting assembly described in this document are used in the manufacture of an electrode. The electrode may be a negative electrode. The current collecting substrate may comprise one or more materials selected from the group consisting of copper, nickel, and copper plated nickel.

In some embodiments, one or more of the first set of reinforcing structures, the second set of reinforcing structures, the third set of reinforcing structures, and the fourth set of reinforcing structures comprises a conductive additive. The conductive additive may comprise graphite, carbon black, acetylene black, ketjen black, fullerenes, graphene, carbon fibers, vapor grown carbon fibers (VGCF), carbon nano-tubes and metallic flakes, metallic fibers, or a conductive ink.

Provided also is a method of forming a current collecting assembly. In some embodiments, the method comprises providing a current collecting substrate. The current collecting substrate may comprise a conductive material and having a first side and a second side. The first side defines a first surface. The second side defines a second surface. Each of the first surface and the second surface defines a surface area. The method may proceed with forming a first assembly of reinforcing structures on the first side of the current collecting substrate. The first assembly of reinforcing structures comprises a first set of reinforcing polymers. The first set of reinforcing polymers comprises a first polymer material, whereby the first assembly mechanically reinforces the current collecting substrate.

In some embodiments, the method also comprises forming a second set of reinforcing structures of the second side of the current collecting substrate. The method also comprises forming a third set of reinforcing structures on the first side of the current collecting substrate. The third set of reinforcing structures intersects with the first set of reinforcing structures.

In some embodiments, the method also comprises forming a fourth set of reinforcing structures on the second side of the current collecting substrate. The fourth set of reinforcing structures intersects with the second set of reinforcing structures.

In some embodiments, the current collecting substrate comprises a mask disposed on the first surface of the current collecting substrate prior to forming the first set of reinforcing structures on the first surface. The mask may define a pattern of the first set of reinforcing structures. The mask may be removed to form the first set of reinforcing structures. Specifically, forming the first set of reinforcing structures may comprise depositing a continuous layer over the mask and removing the mask. A portion of the continuous layer is removed when the mask is removed thereby forming the first set of reinforcing structures.

Also provided is an electrode for a lithium ion battery. In some embodiments, the electrode comprises a current collecting assembly a conductive current collecting substrate having a first side and a second side. The first side defines a first surface. The second side defines a second surface. The current collecting assembly also comprises a first assembly of reinforcing structures comprising a first set of reinforcing structures comprising a first polymer material disposed on and attached to the first side of the current collecting substrate. The current collecting assembly also comprises a first active material disposed on and attached to the first side of the current collecting substrate. The first active material is disposed over and attached to the first assembly of reinforcing structure. The first active material comprises one or more materials selected from the group consisting of silicon, tin, and germanium.

In some embodiments, the first active material comprises at least 30 wt % of a high capacity electroactive material having a capacity of at least 1000 mAh/g. The high capacity material may comprise one or more materials selected from the group consisting of silicon, tin, germanium, and a mixture thereof. In some embodiments, the first active material further comprises graphite. The high capacity electroactive material may be in a form selected from the group consisting of particles, pillared particles, porous particles, porous particle fragments, fibers, flakes, ribbons, and a combination thereof. In some embodiments, the particles, pillared particles, and porous particles are characterized by a $D_{50}$ diameter of at least 1 µm or no more than 40 µm or of between 1 µm and 7 µm, or between 10 µm and 15 µm, or between 20 µm and 25 µm. In some embodiments, the porous particle fragments are characterized by a minimum diameter of at least 10 nm. In the same or other embodiments, the porous particle fragments are characterized by a maximum dimension of no greater than 300 nm. Ins some embodiments, the fibers, flakes, and ribbons are characterized by a minimum dimension of up to 2 µm. In some embodiments, the fibers, flakes, and ribbons are characterized by an aspect ratio of at least 2:1.

In some embodiments, the electrode further comprises a conductive material selected from the group consisting of carbon black, ketjen black, acetylene black, graphite, fullerene, graphene, vapor grown carbon fibers, carbon nanotubes, and metal fibers. The first active material may be silicon. The first active material may be a silicon alloy. The first active material may be a material selected from the group consisting of a silicon oxide, a silicon carbide, and a silicon sulfide.

In some embodiments, the first active material protrudes between reinforcing structures of the first assembly of reinforcing structures and forms electrical and mechanical connections with at least a portion of the first side of the current collecting substrate not covered by the first assembly of reinforcing structures. The first active material may be provided in the form of a layer disposed on and attached to the first surface of the current collecting assembly. The layer may be a continuous layer extending over an entire surface of the current collecting assembly. In some embodiments, the electrode further comprises a second active material disposed upon and attached to the second surface of the current collecting substrate.

The second assembly of reinforcing structures further may comprise a fourth set of reinforcing structures comprising a fourth polymer material disposed upon and attached to the second side of the current collecting substrate. The fourth set of reinforcing structures intersects with the second set of reinforcing structures.

Also provided is a method of fabricating an electrode for use in a lithium ion battery. In some embodiments, the method comprises providing a current collecting assembly. The current collecting assembly may comprise a conductive current collecting substrate having a first side and a second side. The first side defines a first surface. The second side defines a second surface. The current collecting assembly may also comprise a first assembly of reinforcing structures. The first assembly of reinforcing structures may comprise a first set of reinforcing structures. The first set of reinforcing structures may comprise a first polymer material disposed on and attached to the first side of the current collecting substrate. The method may proceed with forming a first active material on the first side of the current collecting substrate thereby to cover the first assembly of reinforcing structures.

In some embodiments, the first active material is in the form of a layer and is formed by depositing a continuous layer of slurry onto the first side of the current collecting substrate and over the first assembly of reinforcing structures. In these embodiments, the slurry may flow in between the reinforcing structures and contacts an exposed portion of the current collecting substrate. In some embodiments, the method also comprises calendering an active material layer to obtain a desired porosity for that layer.

Provided also is a cell including an electrode described in this disclosure. Provided also is a battery including a cell described herein. Finally, provided also is a device including a battery described herein.

DETAILED DESCRIPTION

Figure 1A:
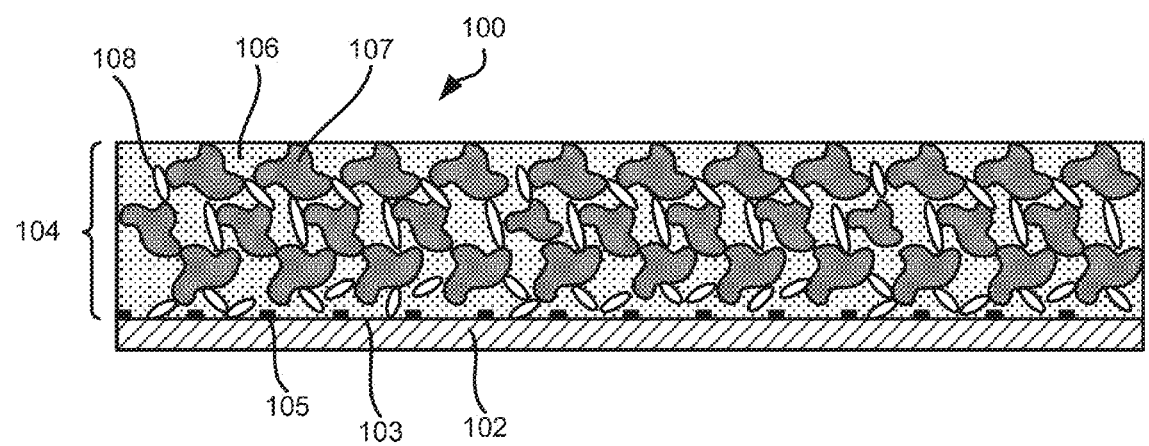
FIG. 1A is a schematic cross-sectional view of an electrode, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

The capacity of a lithium ion battery can be substantially increased by partial or complete replacement of carbon-based active materials with high capacity active materials, such as silicon, tin and germanium. However, integration of these new materials into electrodes has proved to be challenging because of volume changes during lithiation and de-lithiation. Previous integration approaches focused on reducing the size of active material particles and reducing concentrations of active materials. However, these approaches led to low capacity designs and inefficient use of the high capacity active materials.

Volume changes of the high capacity active materials cause significant mechanical stresses that can be damaging to various electrode components. For example, an electrode includes a current collecting substrate and one or two active material layers disposed on the sides of the substrate. Each active material layer contains active material particles. It has been found that cycling large size electrodes with high loadings of silicon particles can cause wrinkling, ripping, cracking, and other types of damage to the current collecting substrate. Without being bound to any particular theory, it is believed that swelling and contraction of active material particles during cycling transfers mechanical stress to the substrate causing its damage.

Generally, the substrate damaging issue can be mitigated by reducing the concentration of high capacity active materials. For example, electrodes fabricated with silicon particles having a concentration of less than 30% by weight (dry) generally do not exhibit significant substrate deterioration. However, raising the silicon concentration to about 50% by weight, i.e., by replacing 20% of graphite with the silicon particles, causes major substrate damage and results in unusable electrodes and cells. Considering that the theoretical capacity of silicon is more than ten times greater than the theoretical capacity of graphite, limiting the silicon concentration negatively impacts the capacity of the cell.

There is a need, therefore, for an electrode assembly that includes current collectors that do not deform or fail when the active material layer disposed thereon comprises high capacity active materials that undergo significant volume changes during the charging and discharging cycles of a battery including the materials. The present disclosure addresses that need.

A first aspect of the disclosure provides a current collecting assembly comprising: (a) 1 current collecting substrate having a first side defining a first surface and a first surface area and a second side defining a second surface and a second surface area; and (b) a first arrangement of reinforcing structures disposed on and attached to the first side of the current collecting substrate; wherein the current collecting substrate comprises a conductive material and the first arrangement of reinforcing structures comprises a first set of reinforcing structures comprising a first polymer material. The first arrangement of reinforcing structures mechanically reinforces the current collecting substrate and prevents deformation of the current collecting substrate as a result of the stresses arising from volume changes associated with the expansion and contraction of the high capacity active material comprised in an active material disposed over the surface of the current collecting assembly during the charging and discharging phases of a battery including the current collecting assembly of the first aspect of the disclosure and the high capacity electroactive materials.

For the avoidance of doubt it should be understood that the terms "surface of the first side" and "first surface" are used interchangeably when referring to the surface of the first side of the current collecting substrate. Similarly the terms "surface of the second side" and "second surface" are used interchangeably when referring to the surface of the second side of the current collecting substrate.

A second aspect of the present disclosure provides a method of fabricating such current collecting assemblies according to the first aspect of the disclosure. A third aspect of the disclosure provides an electrode comprising a current collecting assembly according to the first aspect of the disclosure. A fourth aspect of the disclosure provides a method for manufacturing an electrode according to the third aspect of the disclosure. A fifth aspect of the disclosure provides an electrochemical cell including a current collecting assembly according to the first aspect of the disclosure. A sixth aspect of the disclosure provides a method of fabricating an electrochemical cell according to the fifth aspect of the disclosure.

A current collecting assembly includes a current collecting substrate having two sides. Each side may include an arrangement of reinforcing structures disposed on and attached there to. Each arrangement may include one or more sets of reinforcing structures. The reinforcing structures comprise a polymer material. The polymer material of one of the sets may be different to a polymer material of another set within the arrangement. The polymer material of the reinforcing structures is specifically strongly adherent to the current collecting substrate. Where the arrangement comprises two or more reinforcing structures comprising different polymer materials, one of the polymer materials is suitably strongly adherent to the current collecting substrate and the other polymer material is suitably strongly adherent to layers of active materials deposited over the current collecting assembly. Other materials may be combined with the polymer to improve mechanical and/or electrical characteristics of the reinforcing structures. Optionally the reinforcing structures possess an inherent porosity. The reinforcing structures form a network thereby mechanically reinforcing the current collector substrate In a first embodiment of the first aspect of the disclosure, only one side of the current collecting substrate includes an arrangement of reinforcing structures comprising a first set of reinforcing structures comprising a first polymer material, while another side may be free from reinforcing structures. Such a current collecting assembly may be used for fabricating a single sided electrode that received only one active material layer. Alternatively the current collecting assembly may be used in the manufacture of an electrode comprising on one side an arrangement of reinforcing structures overlaid with an active material layer and on the other side an active material layer disposed on and attached to the current collecting substrate.

Alternatively, in a second embodiment of the first aspect of the disclosure a current collecting assembly comprises a current collecting substrate having a first side defining a first surface, a second side defining a second surface, wherein the first surface comprises a first arrangement of reinforcing structures comprising one or more sets of reinforcing structures disposed thereon and attached thereto and the second surface comprises a second arrangement of reinforcing structures comprising one or more sets of reinforcing structures disposed thereon and attached thereto.

The current collector according to the second embodiment of the first aspect of the disclosure may be used for fabricating a double sided electrode, in which an active material is disposed over a second arrangement of reinforcing structures comprising a second set of reinforcing structures comprising a second polymer material disposed on the surface of the second side of the current collecting substrate. The second arrangement of reinforcing structures may not be added at all or may be added after forming the first active material layer over the first set.

In a third embodiment of the first aspect of the disclosure, the first arrangement of reinforcing structures may include, in addition to the first set of reinforcing structures comprising a first polymer material, a third set of reinforcing structures comprising a third polymer material disposed upon and attached to the first surface of the current collecting substrate. The third polymer material has a different composition to the first polymer material of the first set of reinforcing structures. Specifically the polymer of the first set of reinforcing structures is characterized by a strong level of adhesion to the material of the first surface of the current collecting substrate to which the reinforcing structures are applied. The third polymer material of the third set of reinforcing structures may be characterized by a similar or different level of adhesion to the material of the current collecting substrate as the first polymer material. Specifically by the third polymer material exhibits a high level of adhesion to the material of the active material layer. Specifically in a third embodiment of the first aspect of the disclosure, the current collecting assembly comprises a first arrangement of reinforcing structures comprising a first set of reinforcing structures comprising a first polymer material and a third set of reinforcing structures comprising a third polymer material, wherein the first polymer material is strongly adhered to the material of the current collecting substrate and the third polymer material is strongly adhered to material of the active material layer. The relative levels of adhesion can be measured using mechanical tests such as the Pull-Off method, The Ultrasonic method and the Peel Test method detailed herein above. In a fourth embodiment of the first aspect of the disclosure, the second arrangement of reinforcing structures on the second surface of the current collecting substrate may include, in addition to the second set of reinforcing structures comprising a second polymer material, a fourth set of reinforcing structures comprising a fourth polymer material disposed upon and attached to the second surface of the current collecting substrate. The fourth polymer material has a different composition to the second polymer material of the second set of reinforcing structures. Specifically the polymer of the second set of reinforcing structures is characterized by a strong level of adhesion to the material of the second surface of the current collecting substrate to which the reinforcing structures are applied. The fourth polymer material of the fourth set of reinforcing structures may be characterized by a similar or different level of adhesion to the material of the second surface of the current collecting substrate as the second polymer material. Specifically by the fourth polymer material exhibits a high level of adhesion to the material of the active material layer.

Specifically, the fourth embodiment of the first aspect of the disclosure provides a current collecting assembly comprising an second arrangement of reinforcing structures comprising a second set of reinforcing structures comprising a second polymer material and a fourth set of reinforcing structures comprising a fourth polymer material, wherein the second polymer material is strongly adhered to the material of the second surface of the current collecting substrate and the fourth polymer material is strongly adhered to material of the active material layer applied to the second surface of the current collecting substrate. The relative levels of adhesion can be measured using mechanical methods such as the Pull-off Test and the Peel Test. Arrangements of reinforcing structures comprising two or more sets of reinforcing structures, wherein one of the sets exhibits a strong level of adhesion to the material of the current collecting substrate and the other set exhibits a strong level of adhesion to the material of the active material layer provide the advantage of enhancing the adhesion of an active material to the current collecting substrate and preventing or reducing the extent to which the current collecting substrate is deformed or destroyed as a result of the stresses established within an electrode due to volume changes arising in the active material during the charging and discharging of the battery. One set of reinforcing structures mechanically reinforces the current collecting substrate. The other set of reinforcing structures binds to the material of the active material layer to anchor it to the current collecting substrate. Specifically one set of reinforcing structures will exhibit good adhesion to the material of the active material layer. Specifically the other set of reinforcing structures will exhibit good adhesion to the material of the current collecting substrate.

Specifically, where an arrangement of reinforcing structures comprise two sets of reinforcing structures, one set intersects with the other set at multiple points over a surface of the current collecting substrate. This intersected arrangement of the reinforcing structures over the surface of the current collecting substrate enhances the overall adhesion of the current collector to the active material in an electrode compared to electrodes in which the current collector is devoid of reinforcing structures.

An arrangement of reinforcing structures comprising a set of reinforcing structures may be in a form of a grid or may have random orientation. For example, a square grid, a rectangular grid, a rhombus grid, or other polygon-shaped grids may be used for arranging reinforcing structures in a set. Sufficient spacing may be provided in between reinforcing structures in a set such that a large portion of the substrate remains exposed when the reinforcing structures are formed on the substrate. For example, if a set is attached to a surface and extends over the entire surface, the reinforcing structures may cover less than 40% of the surface or, more specifically, less than 30% or even less than 20% and even less than 10%. Specifically the arrangement of reinforcing structures cover more than 1% of a surface of a substrate to which they are applied, specifically more than 2%, especially more than 5%. As such, most of the surface remains exposed and later used for establishing direct contact with an active material layer that is deposited on the surface of the current collecting substrate during formation of an electrode. The direct contact provides adhesion and conduction between the substrate and the active material layer. Furthermore, it is believed that the set of reinforcing structures provides additional bonding between the substrate and the active material layer.

In some embodiments, an electrode may include two arrangements of reinforcing structures, each arrangement disposed on and attached to a separate (opposite) side of the current collecting substrate. Both arrangements may be disposed on and attached to the current collecting substrate prior to forming any active material layers. Alternatively, a second arrangement may be disposed on and attached to the second side of the current collecting substrate after forming a first active material layer on the first surface of the first side of the current collecting substrate and over the first arrangement of reinforcing structures. Each arrangement of reinforcing structures may comprise one or two sets of reinforcing structures.

In a fifth embodiment of the first aspect of the disclosure, a first arrangement of reinforcing structures are disposed on and attached to the first surface of the current collecting assembly and a second set of reinforcing structures are disposed on and attached to the second surface of the current collecting assembly. The first assembly comprises a first set of reinforcing structures comprising a first polymer material and a third set of reinforcing structures comprising a third polymer material. The second assembly of reinforcing structures comprises a second set of reinforcing structures comprising a second polymer material and a fourth set of reinforcing structures comprising a fourth polymer material. The first, second, third and fourth polymer materials may be the same or different. Specifically the first and second polymer materials are the same or similar. Specifically the third and fourth polymer materials are the same or similar. Specifically the first and second polymer materials are characterized by strong adhesion to the first and second surfaces respectively of the current collecting substrate. Specifically the third and fourth polymer materials are characterized by a strong adherence to the material of an active material layer applied to the first and second surface of the current collecting substrate during the manufacture of an electrode comprising the current collecting assembly.

When reinforcing structures of the two arrangements of reinforcing structures are arranged into similarly shaped and sized grids on opposite sides of the current collecting substrate, the positions of the two grids may coincide. In other words, projections of the reinforcing structures to either side of the current collecting substrate of both arrangements may coincide. Alternatively, the two grids formed by the two arrangements of reinforcing structures may be offset with respect to each other. For example, both arrangements may be arranged into rectangular grids; the offset may be such that the corners of one grid may coincide with centers of rectangular elements of the other grid.

The patterns or grids of the two arrangements may be same or different. For example, one arrangement may have larger spacing between its reinforcing structures than the other set. Furthermore, reinforcing structures of one arrangement may be parallel and/or perpendicular to reinforcing structures of the other arrangement. In some embodiments, the reinforcing structures of one arrangement may be at an angle of between about 30° and 60° relative to the reinforcing structures of the other arrangement disposed on the other side of the substrate.

Where an arrangement of reinforcing structures comprises more than one set of reinforcing structures, the reinforcing structures of one set may be parallel and/or perpendicular to the reinforcing structures of the other set within the arrangement. In some embodiments the reinforcing structures of one set may be at an angle of between about 30° and 60° relative to the reinforcing structures of the other set in the arrangement.

The strength of adhesion of a polymer of a reinforcing structure to the material of the current collecting substrate can be measured using a Pull-off method, an ultrasonic method or a Peel Test method.

The first to fourth polymer materials of the reinforcing structures may, independently, be homo-polymers or block or alternating co-polymers. The polymers may be formed from branched or un-branched monomer species and may include cross-linked structures.

The first to fourth polymer materials may each have a weight average molecular weight in the range 50,000 to 3,000,000, specifically 100,000 to 2,000,000, more specifically 250,000 to 1,500,000, especially 450,000 to 1,000,000.

The reinforcing structures may be porous or non-porous. Porous reinforcing structures may be formed by providing the polymer constituting all or part of the reinforcing structure in the form of a solution in a mixed solvent system comprising two or more components having different boiling points. Evaporation of the lower boiling point solvent on drying the slurry leaves an intimate mixture of a semi-dry polymer and the higher boiling point solvent. Subsequent removal of the second solvent introduces porosity into the polymer structure. The extent and nature of the porosity can be controlled by varying the relative concentration of the two solvents, the number of solvents having different boiling points in the solvent mixture and the rate of change of temperature at which the slurry is dried. Methods of controlling of porosity within a polymer structure are relatively trivial and are well known to a skilled person.

The polymers of the first to fourth sets of reinforcing structures may, independently, be one or more of: polyaniline, polypyrrole, polyacetylene, polyparaphenylene, polyparaphenylene sulphide, polyparavinylen, polythiophene, polyisothionaphthene, and polyacrylonitrile, high performance fiber, Kevlar, or nylon. The polymers of the reinforcing structures specifically have a tensile modulus of greater than 400 MPa, specifically greater than 600 Mpa, more specifically greater than 800 MPa and especially greater than 1000 MPa, for example 2000 to 3000 MPa; such polymers provide mechanical reinforcement of the current collecting substrate, especially when the current collecting assembly is included in an electrode structure comprising a high capacity active material. For comparison, the tensile modulus of copper is about 410 MPa while the tensile modulus of nickel is about 870 MPa. In some embodiments, the reinforcing structures also include a conductive dopant to increase conductivity of these structures. Furthermore, the reinforcing structures may include fillers to increase mechanical properties of these structures.

The elastic or tensile modulus of a polymer gives an indication of its tensile strength and is measured using an Atomic Force Microscope (AFM) using the method set out in Polymer Testing, Vol 31(7) 2012, 926-930. Suitably the polymers of the reinforcing structures have tensile moduli in the range 200 to 8000 MPa, specifically 1200 to 5000 MPa, more specifically 2000 to 3500 MPa.

As indicated above, a second aspect of the disclosure provides a method of fabricating a current collector according to the first aspect of the disclosure, the method comprising (a) providing a current collecting substrate comprising a conductive material having a first side defining a first surface and a second side defining a second surface; and (b) forming a first arrangement of reinforcing structures on the first surface of the first side of the current collecting substrate. Wherein the first arrangement of reinforcing structures comprises a first set of reinforcing structures comprising a first polymer material, whereby the first arrangement mechanically reinforces the current collecting substrate.

Optionally in a first embodiment of the second aspect of the disclosure, current collecting substrates having an arrangement of reinforcing structures on one surface only are fabricated.

A second embodiment of the second aspect of the disclosure the method comprises the further step of forming a second arrangement of reinforcing structures comprising a second set of reinforcing structures comprising a second polymer material on the second surface on the second side of the current collecting substrate. The first polymer material may be the same as or different to the second polymer material. Specifically the first polymer material is the same as the second polymer material.

A third embodiment of the second aspect of the disclosure comprises the further step of forming a third set of reinforcing structures comprising a third polymer material on the first surface of the current collecting substrate. The third set of reinforcing structures can be disposed on and attached to the first surface of the current collecting substrate at the same time as or after disposition and attachment of the first set of reinforcing structures comprising a first polymer material. As indicated above the third polymer material can be the same as or different to the first polymer material. Specifically the first polymer material is different to the third polymer material. Specifically the first set of reinforcing structures intersect with the third set of reinforcing structures at one or more locations over the extent of the first set of reinforcing structures.

The third set of reinforcing structures may be configured in parallel with the first set of reinforcing structures or at an angle to the first set of reinforcing structures. Parallel configurations of the first and third sets of reinforcing structures may include patterns in which reinforcing structures belonging to the first set alternate with reinforcing structures belonging to the third set. Other patterns include interspersing blocks of reinforcing structures belonging to the first set with blocks of reinforcing structures belonging to the third set of reinforcing structures. The alternating and interspersed configurations of the first and third reinforcing structures may be formed into a grid pattern in which a first configuration of alternating or interspersed reinforcing structures are disposed at an angle to a second configuration of alternating or interspersed reinforcing structures. Specifically the first and third reinforcing structures are provided in a woven configuration which can be applied to the current collecting substrate using laminating techniques.

In accordance with the third embodiment of the second aspect of the disclosure, the third set of reinforcing structures can be deposited onto and attached to a first surface of the current collecting substrate before or after deposition of the second set of reinforcing structures onto the second surface of the current collecting substrate. The method of the second aspect of the disclosure may comprise the steps of simultaneously or sequentially forming a first set of reinforcing structures and a third set of reinforcing structures onto the first surface of the current collecting substrate. The method of third embodiment of the second aspect of the disclosure may or may not include the step of forming a second arrangement of reinforcing structures onto the second surface of the current collecting substrate.

A fourth embodiment of the second aspect of the disclosure comprises the further step of forming a fourth set of reinforcing structures comprising a fourth polymer material on the second surface of the current collecting substrate. The fourth set of reinforcing structures can be disposed on and attached to the second surface of the current collecting substrate at the same time as or after disposition and attachment of the second set of reinforcing structures comprising a second polymer material. As indicated above the fourth polymer material can be the same as or different to the second polymer material. Specifically the second polymer material is different to the fourth polymer material.

The fourth set of reinforcing structures may be configured in parallel with the second set of reinforcing structures or at an angle to the second set of reinforcing structures. Parallel configurations of the second and fourth sets of reinforcing structures may include patterns in which reinforcing structures belonging to the second set alternate with reinforcing structures belonging to the fourth set. Other patterns include interspersing blocks of reinforcing structures belonging to the second set with blocks of reinforcing structures belonging to the fourth set of reinforcing structures. The alternating and interspersed configurations of the second and fourth reinforcing structures may be formed into a grid pattern in which a first configuration of alternating or interspersed reinforcing structures are disposed at an angle to a second configuration of alternating or interspersed reinforcing structures. Specifically the second and fourth reinforcing structures are provided in a woven arrangement, which may be applied to the current collecting substrate using laminating techniques.

The first arrangement of reinforcing structures may be deposited onto the first surface of the current collecting substrate before or simultaneously with the deposition of the second arrangement of reinforcing structures on the second surface of the current collecting substrate. The first and second arrangements may both comprise one or more sets of reinforcing structures. The method of the second aspect of the disclosure may be used to prepare current collecting assemblies in which one or both surfaces include one or more sets of reinforcing structures. The first and second sets of reinforcing structures may be deposited onto the first and second surfaces before deposition of the third and fourth sets of reinforcing structures. The first and second sets of reinforcing structures may be deposited onto the first and second surfaces respectively of the current collecting substrate after deposition of the third and fourth sets of reinforcing structures. Finally, the first and second sets of reinforcing structures may be deposited onto the first and second surfaces respectively of the current collecting substrate simultaneously with the deposition of the third and fourth reinforcing structures.

Specifically the first set of reinforcing structures intersects with the third set of reinforcing structures at multiple points over the surface of the substrate. Specifically the second set of reinforcing structures intersects with the fourth set of reinforcing structures. Specifically the first and third sets of reinforcing structures are provided in a woven configuration. Specifically the second and fourth sets of reinforcing structures are provided in a woven configuration.

Arrangements of reinforcing structures comprising sets of reinforcing structures can be deposited on and attached to the surface of a current collecting substrate using techniques that are well known to a skilled person. Such techniques include lamination, screen printing, lithographic deposition, spray coating and electro-spinning. The conditions used to attach the reinforcing structures to the current collecting substrate can be readily determined by the skilled person.

Preformed arrangements of reinforcing structures may be attached to the surface of the current collecting substrate using lamination. Lamination is particularly suitable for attaching woven configurations of pre-formed reinforcing structures to the surface of the current collector. The lamination step is suitably carried out at a temperature of greater than 20° C., specifically greater than 30° C., more specifically greater than 40° C., for example 50° C., 60° C., 70° C. or 80° C. Specifically the lamination step is carried out at a temperature of less than 200° C., specifically less than 150° C., more specifically less than 100° C., for example 80° C. or less. Calendering may be used to enhance the strength of adhesion to the current collecting substrate.

Reinforcing structures are suitably formed on the current collecting substrate by depositing a solution of a reinforcing structure-polymer material in a solvent onto a surface of the current collecting substrate and evaporating the solvent to form the reinforcing structure. Solutions of the reinforcing structure-polymer may be deposited using screen printing techniques or spray drying techniques. Solutions of the reinforcing structure-polymer may also be deposited over a lithography mask on the surface of the current collecting substrate; reinforcing structures remain on the current collecting substrate surface on removal of the mask.

In some embodiments, of the second aspect of the disclosure, the method comprises the step of depositing a mask on one or both sides of the current collecting substrate, prior to forming an arrangement of reinforcing structures or a set of reinforcing structures on the surface. The mask defines a pattern of the arrangement of reinforcing structures or one of the sets of the reinforcing structures. Reinforcing structures are formed on the surface of the current collecting substrate by depositing a continuous layer of a solution of a reinforcing structure-polymer over the mask and removing the mask. Removal of the mask causes removal of a portion of the continuous layer to leave a pattern of reinforcing structures attached to the surface of the current collecting substrate, the pattern of the reinforcing structures on the substrate surface being defined by the pattern of the mask. One or more masks may be formed on one or both sides of the current collecting substrate to facilitate the formation of an arrangement of reinforcing structures comprising one or more sets of reinforcing structures.

Solutions of the reinforcing structure-polymer suitably comprise at least 1 wt % of polymer material, specifically at least 2 wt %, more specifically at least 5 wt % and especially at least 10 wt %. The solutions of the reinforcing structure-polymer suitably comprise no more than 50 wt % of polymer material, specifically no more than 30 wt %, more specifically no more than 20 wt % and especially no more than 15 wt %. The actual concentration of reinforcing structure-polymer in the solution will depend on the weight average molecular weight of the polymer and its solubility in the solvent and will be readily determined by a skilled man.

The solution of the reinforcing structure-polymer may further comprise additional components to enhance adhesion of the polymer to the surface of the current collecting substrate. An example of an additional component that may be added to the reinforcing structure-polymer solution is oxalic acid. Oxalic acid may be added to the solution in an amount of at least 0.05 wt %, specifically at least 0.1 wt %. Specifically the oxalic acid comprises no more than 5 wt % of the solution, specifically no more than 2 wt % and especially no more than 1 wt %. Conductive additives may also be added to the reinforcing structure-polymer solution. These conductive additives enhance the electrical conductivity of the reinforcing structures formed from these polymer solutions. Examples of conductive additives that may be added to the solution include graphite, carbon black, acetylene black, ketjen black, fullerenes, graphene, carbon fibres including vapour grown carbon fibres (VGCF), carbon nano-tubes and metallic flakes. The conductive additive suitably constitutes more than 0.5 wt % of the solution, specifically more than 1 wt %. The conductive additive suitably constitutes no more than 60 wt % of the solution, specifically no more than 50 wt %. Polymer solutions comprising 1 to 50 wt % of a conductive additive may be used.

A third aspect of the disclosure provides an electrode for a lithium ion battery, the electrode comprising: (a) a current collecting assembly comprising a conductive current collecting substrate having a first side defining a first surface and a first surface area, a second side defining a second surface and a second surface area and a first arrangement of reinforcing structures comprising a first set of reinforcing structures comprising a first polymer material disposed on and attached to the first side of the current collecting substrate; (b) a first active material layer comprising a high capacity first active material disposed on and attached to the first side of the current collecting substrate; wherein (i) the first active material layer is disposed on and attached to the first arrangement of reinforcing structures and first surface of the current collecting substrate; and (ii) the high capacity first active material comprises a high capacity electroactive material Specifically the first active material layer comprises at least 10 wt % of a high capacity first electroactive material, specifically at least 20 wt %, more specifically at least 30 wt % and especially at least 50 wt %. Specifically the first active material layer comprises not more than 90 wt % of a high capacity first active material, specifically no more than 80 wt %, specifically no more than 60 wt %. The first active material layer may, for example, comprise 15 to 18 wt % of a high capacity electroactive material, for example 16 wt %. The first active material is suitably a high capacity electroactive material having a capacity of at least 1000 mAh/g. Specifically the first active material comprises one or more of silicon, tin and germanium and mixtures, compounds and alloys thereof.

The first high capacity active material may be provided in the form of particles including pillared particles, porous particles and porous particle fragments; fibres, flakes or ribbons or mixtures thereof. Where the first high capacity active material is provided in the form of particles, pillared particles, porous particles or porous particle fragments, these particles suitably have a $D_{50}$ diameter of at least 1 µm, specifically at least 2 µm, more specifically at least 5 µm, for example at least 10 µm. The active material particles suitably have a diameter of no more than 40 µm, specifically no more than 30 µm, more specifically no more than 25 µm, for example no more than 10 µm. Porous particles may be formed from fragments having a $D_{50}$ diameter of less than 300 nm, specifically less than 200 nm, for example 50 to 100 nm.

In some embodiments, the particles have a $D_{50}$ diameter in the range 1 to 7 µm. Optionally the $D_{50}$ particle diameter may be at least 1.5 µm, at least 2 µm, at least 2.5 µm or at least 3 µm. Optionally the $D_{50}$ particle diameter may be no more than 6 µm, no more than 5 µm, no more than 4.5 µm, no more than 4 µm, or no more than 3.5 µm. It has been found that particles within this size range are ideally suited for use in hybrid anodes for metal-ion batteries, due to their dispersibility in slurries, their ability to occupy void space between conventional synthetic graphite particles in anode layers, their structural robustness and their resilience to repeated charge-discharge cycles.

In a second embodiment the high capacity active material comprises particles having a $D_{50}$ diameter in the range 10 to 15 µm.

In a third embodiment the particles have a $D_{50}$ diameter in the range 20 to 25 µm.

Specifically, the particles have a narrow size distribution span. For instance, the particle size distribution span (defined as $(D_{90}-D_{10})/D_{50}$) is specifically 5 or less, more specifically 4 or less, more specifically 3 or less, more specifically 2 or less, and most specifically 1.5 or less.

For the avoidance of doubt, the term "particle diameter" as used herein refers to the equivalent spherical diameter (esd), i.e. the diameter of a sphere having the same volume as a given particle, wherein the particle volume is understood to include the volume of the intra-particle pores. The terms "$D_{50}$" and "$D_{50}$ particle diameter" as used herein refer to the volume-based median particle diameter, i.e. the diameter below which 50% by volume of the particle population is found. The terms "$D_{10}$" and "$D_{10}$ particle diameter" as used herein refer to the 10th percentile volume-based median particle diameter, i.e. the diameter below which 10% by volume of the particle population is found. The terms "$D_{90}$" and "$D_{90}$ particle diameter" as used herein refer to the 90th percentile volume-based median particle diameter, i.e. the diameter below which 90% by volume of the particle population is found. The terms "$D_{99}$" and "$D_{99}$ particle diameter" as used herein refer to the 99th percentile volume-based median particle diameter, i.e. the diameter below which 99% by volume of the particle population is found.

Particle diameters and particle size distributions can be determined by routine laser diffraction techniques. Laser diffraction relies on the principle that a particle will scatter light at an angle that varies depending on the size the particle and a collection of particles will produce a pattern of scattered light defined by intensity and angle that can be correlated to a particle size distribution. A number of laser diffraction instruments are commercially available for the rapid and reliable determination of particle size distributions. Unless stated otherwise, particle size distribution measurements as specified or reported herein are as measured by the conventional Malvern Mastersizer 2000 particle size analyzer from Malvern Instruments. The Malvern Mastersizer 2000 particle size analyzer operates by projecting a helium-neon gas laser beam through a transparent cell containing the particles of interest suspended in an aqueous solution. Light rays which strike the particles are scattered through angles which are inversely proportional to the particle size and a photodetector array measures the intensity of light at several predetermined angles and the measured intensities at different angles are processed by a computer using standard theoretical principles to determine the particle size distribution. Laser diffraction values as reported herein are obtained using a wet dispersion of the particles in distilled water. The particle refractive index is taken to be 3.50 and the dispersant index is taken to be 1.330. Particle size distributions are calculated using the Mie scattering model.

By the term porous shall be understood as referring to a high capacity electroactive particle comprising a plurality of pores, voids or channels within a particle structure. The term "porous particle" shall be understood in particular to include particles comprising a random or ordered network of linear, branched or layered elongate structural elements, wherein interconnected void spaces or channels are defined between the elongate structural elements of the network, the elongate structural elements suitably including linear, branched or layered fibres, tubes, wires, pillars, rods, ribbons, plates or flakes. Specifically the porous particles have a substantially open porous structure such that substantially all of the pore volume of the porous particles is accessible to a fluid from the exterior of the particle, for instance to a gas or to an electrolyte. By a substantially open porous structure, it is meant that at least 90%, specifically at least 95%, specifically at least 98%, specifically at least 99% of the pore volume of the porous particles is accessible from the exterior of the particles.

The intra-particle porosity of the porous particles should be distinguished from the inter-particle porosity of the high capacity electroactive porous particles. Intra-particle porosity is defined by the ratio of the volume of pores within a particle to the total volume of the particle. Inter-particle porosity is the volume of pores between discrete particles and is a function both of the size and shape of the individual particles and of the packing density of the particulate material. The total porosity of the particulate material may be defined as the sum of the intra-particle and inter-particle porosity.

The intra-particle porosity of the porous particles is specifically at least 60%, specifically at least 65%, more specifically at least 70%, more specifically at least 75%, and most specifically at least 78%. The intra-particle porosity is specifically no more than 87%, more specifically no more than 86%, and most specifically no more than 85%.

The intra-particle porosity of the porous particles may be measured by mercury porosimetry. Mercury porosimetry is a technique that characterises the porosity of a material by applying varying levels of pressure to a sample of the material immersed in mercury. The pressure required to intrude mercury into the pores of the sample is inversely proportional to the size of the pores. More specifically, mercury porosimetry is based on the capillary law governing liquid penetration into small pores. This law, in the case of a non-wetting liquid such as mercury, is expressed by the Washburn equation:

$$D=(1/P) \cdot 4\gamma \cdot \cos \phi$$

wherein D is pore diameter, P is the applied pressure, $\gamma$ is the surface tension, and $\phi$ is the contact angle between the liquid and the sample. The volume of mercury penetrating the pores of the sample is measured directly as a function of the applied pressure. As pressure increases during an analysis, pore size is calculated for each pressure point and the corresponding volume of mercury required to fill these pores is measured. These measurements, taken over a range of pressures, give the pore volume versus pore diameter distribution for the sample material. The Washburn equation assumes that all pores are cylindrical. While true cylindrical pores are rarely encountered in real materials, this assumption provides sufficiently useful representation of the pore structure for most materials. For the avoidance of doubt, references herein to pore diameter shall be understood as referring to the equivalent cylindrical dimensions as determined by mercury porosimetry. Values obtained by mercury porosimetry as reported herein are obtained in accordance with ASTM UOP574-11, with the surface tension $\gamma$ taken to be 480 mN/m and the contact angle $\phi$ taken to be 140° for mercury at room temperature. The density of mercury is taken to be 13.5462 g/cm$^3$ at room temperature.

For a sample in the form of a powder of porous particles, the total pore volume of the sample is the sum of intra-particle and inter-particle pores. This gives rise to an at least bimodal pore diameter distribution curve in a mercury porosimetry analysis, comprising a set of one or more peaks at lower pore sizes relating to the intra-particle pore diameter distribution and a set of one or more peaks at larger pore sizes relating to the inter-particle pore diameter distribution. From the pore diameter distribution curve, the lowest point between the two sets of peaks indicates the diameter at which the intra-particle and inter-particle pore volumes can be separated. The pore volume at diameters greater than this is assumed to be the pore volume associated with inter-particle pores. The total pore volume minus the inter-particle pore volume gives the intra-particle pore volume from which the intra-particle porosity can be calculated.

A number of high precision mercury porosimetry instruments are commercially available, such as the AutoPore IV series of automated mercury porosimeters available from Micromeritics Instrument Corporation, USA. For a complete review of mercury porosimetry reference may be made to P. A. Webb and C. Orr in "Analytical Methods in Fine Particle Technology, 1997, Micromeritics Instrument Corporation, ISBN 0-9656783-0.

It will be appreciated that mercury porosimetry and other intrusion techniques are effective only to determine the pore volume of pores that are accessible to mercury (or another fluid) from the exterior of the porous particles to be measured. As noted above, substantially all of the pore volume of the particles of the disclosure is accessible from the exterior of the particles, and thus porosity measurements by mercury porosimetry will generally be equivalent to the entire pore volume of the particles. Nonetheless, for the avoidance of doubt, intra-particle porosity values as specified or reported herein shall be understood as referring to the volume of open pores, i.e. pores that are accessible to a fluid from the exterior of the particles of the disclosure. Fully enclosed pores which cannot be identified by mercury porosimetry shall not be taken into account herein when specifying or reporting intra-particle porosity.

A sample of the high capacity electroactive porous particulate material is characterised by having at least two peaks in the pore diameter distribution as determined by mercury porosimetry, at least one peak at lower pore sizes being associated with intra-particle pores and at least one peak at higher pore sizes being associated with inter-particle porosity. The high capacity electroactive porous particulate material specifically has a pore diameter distribution having at least one peak at a pore size less than 350 nm, more specifically less than 300 nm, more specifically less than 250 nm, and most specifically less than 200 nm, as determined by mercury porosimetry. Specifically, the pore diameter distribution has at least one peak at a pore size of more than 50 nm, more specifically more than 60 nm, and most specifically more than 80 nm, as determined by mercury porosimetry.

Specifically the high capacity electroactive porous particulate material is also characterised by a peak in the pore diameter distribution of a loose packed plurality of particles relating to the inter-particle porosity at a pore size of no more than 1000 nm, as determined by mercury porosimetry.

The porous particles are specifically spheroidal in shape. Spheroidal particles as defined herein may include both spherical and ellipsoidal particles and the shape of the particles may suitably be defined by reference to their sphericity and aspect ratio. Spheroidal particles are found to be particularly well-suited to dispersion in slurries without the formation of agglomerates.

The sphericity of an object is conventionally defined as the ratio of the surface area of a sphere to the surface area of the object, wherein the object and the sphere have identical volume. However, in practice it is difficult to measure the surface area and volume of individual particles at the micron scale. However, it is possible to obtain highly accurate two-dimensional projections of micron scale particles by scanning electron microscopy (SEM) and by dynamic image analysis, in which a digital camera is used to record the shadow projected by a particle. The term "sphericity" as used herein shall be understood as the ratio of the area of the particle projection to the area of a circle, wherein the particle projection and circle have identical circumference. Thus, for an individual particle, the sphericity S may be defined as:

$$S = \frac{4 \cdot \pi \cdot A_m}{(C_m)^2}$$

wherein $A_m$ is the measured area of the particle projection and $C_m$ is the measured circumference of the particle projection. The average sphericity $S_{av}$ of a population of particles as used herein is defined as:

$$S_{av} = \frac{1}{n}\sum_{i=1}^{n}\left[\frac{4 \cdot \pi \cdot A_m}{(C_m)^2}\right]$$

wherein n represents the number of particles in the population.

As used herein, the term "spheroidal" as applied to the particles of the disclosure shall be understood to refer to a material having an average sphericity of at least 0.70. Specifically, the high capacity electroactive porous particles have an average sphericity of at least 0.85, more specifically at least 0.90, more specifically at least 0.92, more specifically at least 0.93, more specifically at least 0.94, more specifically at least 0.95, more specifically at least 0.96, more specifically at least 0.97, more specifically at least 0.98 and most specifically at least 0.99.

The average aspect ratio of the porous particles is specifically less than 3:1, more specifically no more than 2.5:1, more specifically no more than 2:1, more specifically no more than 1.8:1, more specifically no more than 1.6:1, more specifically no more than 1.4:1 and most specifically no more than 1.2:1. As used herein, the term "aspect ratio" refers to the ratio of the longest dimension to the shortest dimension of a two-dimensional particle projection. The term "average aspect ratio" refers to a number-weighted mean average of the aspect ratios of the individual particles in the particle population.

It will be understood that the circumference and area of a two-dimensional particle projection will depend on the orientation of the particle in the case of any particle which is not perfectly spheroidal. However, the effect of particle orientation may be offset by reporting sphericity and aspect ratios as average values obtained from a plurality of particles having random orientation. A number of SEM and dynamic image analysis instruments are commercially available, allowing the sphericity and aspect ratio of a particulate material to be determined rapidly and reliably. Unless stated otherwise, sphericity values as specified or reported herein are as measured by a CamSizer XT particle analyzer from Retsch Technology GmbH. The CamSizer XT is a dynamic image analysis instrument which is capable of obtaining highly accurate distributions of the size and shape for particulate materials in sample volumes of from 100 mg to 100 g, allowing properties such as average sphericity and aspect ratios to be calculated directly by the instrument.

The high capacity electroactive porous particulate material specifically has a BET surface area of less than 300 $m^2/g$, more specifically less than 250 $m^2/g$, more specifically less than 200 $m^2/g$, more specifically less than 150 $m^2/g$, more specifically less than 120 $m^2/g$. The high capacity electroactive porous particulate material may have a BET surface area of less than 100 $m^2/g$, for example less than 80 $m^2/g$. Suitably, the BET surface may be at least 10 $m^2/g$, at least 15 $m^2/g$, at least 20 $m^2/g$, or at least 50 $m^2/g$. The term "BET surface area" as used herein should be taken to refer to the surface area per unit mass calculated from a measurement of the physical adsorption of gas molecules on a solid surface, using the Brunauer-Emmett-Teller theory, in accordance with ASTM B922/10.

Control of the BET surface area of electroactive material is an important consideration in the design of anodes for metal ion batteries. A BET surface area which is too low results in unacceptably low charging rate and capacity due to the inaccessibility of the bulk of the electroactive material to metal ions in the surrounding electrolyte. However, a very high BET surface area is also known to be disadvantageous due to the formation of a solid electrolyte interphase (SEI) layer at the anode surface during the first charge-discharge cycle of the battery. SEI layers are formed due to reaction of the electrolyte at the surface of electroactive materials and can consume significant amounts of metal ions from the electrolyte, thus depleting the capacity of the battery in subsequent charge-discharge cycles. While previous teaching in the art focuses on an optimum BET surface area below about 10 $m^2/g$, it has been found that a much wider BET range can be tolerated.

Specifically, the high capacity electroactive porous particles comprise a network of interconnected irregular elongate structural elements comprising the electroactive material which may be described as acicular, flake-like, dendritic, or coral-like. This particle architecture is associated with an interconnected network of pores, specifically with a substantially even distribution of the pores throughout the particle. In some embodiments, the porous particles comprise networks of fine structural elements having an aspect ratio of at least 2:1 and more specifically at least 5:1. A high aspect ratio of the structural elements provides a high number of interconnections between the structural elements constituting the porous particles for electrical continuity.

The thickness of the structural elements constituting the porous particles is an important parameter in relation to the ability of the electroactive material to reversibly intercalate and release metal ions. Structural elements which are too thin may result in excessive first cycle loss due to excessively high BET surface area resulting in the formation of an SEI layer. However, structural elements which are too thick are placed under excessive stress during intercalation of metal ions and also impede the insertion of metal ions into the bulk of the silicon material. The high capacity electroactive porous particulate material provides an optimum balance of these competing factors due to the presence of structural elements of optimized size and proportions. Thus, the porous particles specifically comprise structural elements having a smallest dimension less than 300 nm, specifically less than 200 nm, more specifically less than 150 nm, and a largest dimension at least twice, and specifically at least five times the smallest dimension. The smallest dimension is specifically at least 10 nm, more specifically at least 20 nm, and most specifically at least 30 nm.

The electroactive material containing structural elements constituting the porous particles specifically comprise amorphous or nanocrystalline electroactive material having a crystallite size of less than 100 nm, specifically less than 60 nm. The structural elements may comprise a mixture of amorphous and nanocrystalline electroactive material. The crystallite size may be determined by X-ray diffraction spectrometry analysis using an X-ray wavelength of 1.5456 nm. The crystallite size is calculated using the Scherrer equation from a 2θ XRD scan, where the crystallite size $d=K\cdot\lambda/(B\cdot\cos\theta_B)$, the shape constant K is taken to be 0.94, the wavelength $\lambda$ is 1.5456 nm, $\theta_B$ is the Bragg angle associated with the 220 silicon peak, and B is the full width half maximum (FWHM) of that peak. Suitably the crystallite size is at least 10 nm.

By the term porous particle fragment it should be understood to mean a particle comprising one or more structural elements derived from a network of interconnected irregular structural elements constituting a porous particle. Such fragments are described in GB 1115262.6.

Porous particle fragments are characterized by a minimum $D_{50}$ diameter of at least 10 nm, more specifically at least 20 nm, and most specifically at least 30 nm. Specifically the porous particle fragments are characterised by a smallest $D_{50}$ diameter of less than 300 nm, specifically less than 200 nm, more specifically less than 150 nm, and a largest $D_{50}$ diameter of at least twice, and specifically at least five times the smallest dimension.

Pillared particle structures that can be included in the active material layer of the electrode of the third aspect of the disclosure are substantially as described in US 2011/0067228, US 2011/0269019 and US 2011/0250498 or are prepared using the techniques described in U.S. Pat. No. 7,402,829, JP 2004281317, US 2010/0285358, US 2010/0297502, US 2008/0261112 or WO 2011/117436.

Wires, fibres, rods or ribbons may have smallest dimensions as the diameter or minimum thickness of up to 2 microns, optionally about 0.1 microns, specifically 10 to 300 nm and may have lengths of more than 1 μm, optionally more than 5 μm with aspect ratios of at least 2:1, optionally at least 5:1, at least 10:1, at least 100:1 or at least 1000:1. The smallest dimensions may be at least about 10 nm. The ribbons may have widths that are at least twice the minimum thickness, optionally at least five times the minimum thickness.

Flakes may have a thickness of at least 20 nm, and a thickness of up to about 20 microns or 10 microns, 2 microns, optionally about 0.1 microns, and other dimensions in the range of 5-50 microns.

The size, sphericity, BET values and inherent porosity of all the particulate materials disclosed herein can be determined using the techniques referred to above.

Fibers for inclusion in the active material layer of the electrode of the third aspect of the disclosure are substantially as described in U.S. Pat. No. 8,101,298. The fibers may be substantially solid or may include pores or voids distributed over the surface thereof. Flakes and ribbons for inclusion in the active material layer of the third aspect of the disclosure are substantially as described in US 2010/0190061 (which also may be substantially solid or have pores or voids distributed over the surface thereof).

The first (or second) active material layer may further comprise an additional particulate electroactive material. Specifically the first active material layer may comprise, in addition to the first high capacity electroactive material, at least one component selected from (i) a binder; (ii) a conductive additive; and (iii) an additional particulate electroactive material. Specifically the additional particulate electroactive material has an intrinsic capacity of less than 1000 mAh/g; examples of suitable materials include electroactive carbon materials such as graphite and hard carbon.

In a fourth embodiment of the third aspect of the disclosure, the electrode further comprises a second active material layer comprising a high capacity second active material disposed on and attached to the second side of the current collecting substrate, wherein the second side of the current collecting substrate is devoid of reinforcing structures.

In a fifth embodiment of the third aspect of the disclosure, the electrode further comprises a second active material layer comprising a high capacity second active material disposed on and attached to the second side of the current collecting substrate, wherein the second side of the current collecting substrate is comprises a second arrangement of reinforcing structures comprising at least one set of reinforcing structures.

In a sixth embodiment of the third aspect of the disclosure, the electrode further comprises a third set of reinforcing structures disposed upon and attached to the first surface and a first active material layer applied there over and one or more sets of reinforcing structures applied to the second surface and a second active material layer applied there over. The first and second active material layers may be the same or different. Specifically the first and second active material layers are the same.

The first active material layer of the electrode of the third aspect of the disclosure may further comprise an electroactive carbon material. Specifically the first active material layer comprises at least 10 wt % electroactive carbon, specifically 20 wt %, more specifically at least 40 wt %, especially at least 50 wt %, for example at least 60 wt %. Specifically the first active material layer comprises no more than 90 wt % electroactive carbon, specifically no more than 80 wt %, more specifically no more than 70 wt %, for example 64 wt %. Suitable forms of electroactive carbon include graphite and hard carbon, especially spherical forms of graphite and hard carbon.

In one embodiment the ratio of the electroactive carbon material to the high capacity electroactive material is suitably in the range of from 50:50 to 99:1 by weight, more specifically from 60:40 to 98:2 by weight, more specifically 70:30 to 97:3 by weight, more specifically 80:20 to 96:4 by weight, and most specifically 85:15 to 95:5 by weight.

In another embodiment the ratio of the electroactive carbon material to the high capacity electroactive material is suitably in the range of from 1:99 to 50:50 by weight, more specifically from 98:2 to 40:60, most specifically from 30:70 to 3:97.

The electroactive carbon material and the first high capacity electroactive material of the disclosure together specifically constitute at least 50 wt %, more specifically at least 60% by weight of, more specifically at least 70 wt %, and most specifically at least 80 wt %, for example at least 85 wt %, at least 90 wt %, or at least 95 wt % of the total weight of the electrode composition.

Suitably the electroactive carbon material comprises spheroidal particles having an average sphericity of at least 0.70, specifically at least 0.85, more specifically at least 0.90, more specifically at least 0.92, more specifically at least 0.93, more specifically at least 0.94 and most specifically at least 0.95. Specifically the first (or second) active material layer comprises particles of graphite and/or hard carbon having a sphericity in this range.

The electroactive carbon material specifically has an aspect ratio of less than 3:1, specifically no more than 2.5:1, more specifically no more than 2:1, more specifically no more than 1.8:1, more specifically no more than 1.6:1, more specifically no more than 1.4:1 and most specifically no more than 1.2:1. Specifically the first (and or second) active material layer comprises particles of graphite and/or hard carbon having an aspect ratio in this range.

Suitably the spherical graphite and hard particles have $D_{50}$ particle diameter in the range of from 10 to 50 μm, specifically from 10 to 40 μm, more specifically from 10 to 30 μm and most specifically from 10 to 25 μm, for example from 15 to 25 μm. Where the graphite and/or hard carbon has a $D_{50}$ particle diameter within this range, the high capacity electroactive material is advantageously adapted to occupy void space between the particles of the electroactive carbon material, particularly where these electroactive carbon particles are spheroidal in shape.

The first active material layer of the third aspect of the disclosure may further comprise a binder. Suitably the first active material layer comprises at least 0.5 to 20 wt % of a binder, specifically 1 to 15 wt % and most specifically 2 to 10 wt % based on the total weight of the active material layer. Suitable binders for inclusion in the first active material layer include polyvinylenedifluoride (PVDF), polyvinylenedifluoride-hexafluoropropene (PVDF-HFP) co-polymer, polyvinylenedifluoride-tetrafluoroethylene copolymer (PVDF-TFE), polytetrafluoroethylene (PTFE), fluorinated rubber, styrene butadiene rubber (SBR), nitrile-butadiene-styrene co-polymer, methacrylic acid ester, acrylic acid ester, acrylic nitrile-acid ester copolymer, ethylene-propylene rubber, polyvinyl alcohol (PVA), polyvinyl acetate, ethyl cellulose, methyl cellulose, polyacrylic acid (PAA), hydroxyethyl cellulose (HEC), carboxymethylcelluloe (CMC), polyphenylene ether, polysulfone, polyether sulfone, polypehenylene sulfone, polyether imide, poly amide imide, poly amide, poly imide and polyalginates, salts or mixtures thereof. The binders may be provided in the form of homopolymers, copolymers or modified homopolymers or copolymers derived there from. Suitably the binder is provided in the form of an alkali metal salt thereof. Suitably the binder is provided in the form of an alkali metal salt, in which 30 to 80% of the groups in the polymer capable of forming a salt are in the form of an alkali metal salt. Suitably the binder polymers have a weight average molecular weight in the range 200,000 to 3,000,000, specifically 300,000 to 2,500,000, especially 450,000 to 1,000,000. The binder polymers may also be characterized by their tensile strength and their strength of adhesion to the current collecting substrate and also to the polymers of the reinforcing structures.

Suitably the binder polymers are characterized by a tensile strength in the range 200 to 8000 MPa, specifically 1200 to 5000 MPa, more specifically 2000 to 350 MPa. Techniques used to measure the tensile strength of polymer species are outlined herein above.

Suitably the binder polymers are characterized by a strength of adhesion to a copper substrate in the range $10^4$ to $10^6$ Pa. Techniques used to determine the strength of adhesion of the binder polymer to the underlying substrate are discussed above.

Suitably the binder polymers are characterized by a strength of adhesion to a layer comprising a first reinforcing polymer of at least $10^4$ to $10^6$ Pa. The strength of adhesion is determined using the techniques discussed above that are well known to a skilled person.

Suitably the binder polymers are characterized by a strength of adhesion to a layer comprising a third reinforcing polymer of at least $10^4$ to $10^6$ Pa. Techniques used to determine the strength of adhesion are discussed above and are well known to a skilled person.

The active material layer of the electrode of the third aspect of the disclosure may further include a conductive material. Specifically the active material layer comprises 0.5 to 20 wt % of a conductive material, specifically 1 to 15 wt %, most specifically 2 to 10 wt %. Suitable conductive materials include carbon black including ketjen black, acetylene black, graphite, fullerenes, graphene, vapor grown carbon fibers, polyacrylonitrile fibers, polypyrrole, carbon nano-tubes and metal fibers.

In some embodiments of the third aspect of the disclosure, the active material layer of the electrode comprises 16 wt % of a high capacity active material, 64 wt % of graphite, 10 wt % of a binder and 10 wt % of a conductive carbon composition. The high capacity active material may be silicon, tin or germanium but is specifically silicon.

In one embodiment the binder is carboxy-methylcellulose having a molecular weight in the range 350,000 to 500,000. Alternatively a polyacrylic acid binder having a weight average molecular weight of 450,00 to 3,000,000, specifically 500,000 to 2,000,000, more specifically 1000,000 to 1,500,000 may be used. The polyacrylic acid binder may be provided in the form of a salt with a sodium ion. Specifically the polyacrylic acid binder is provided in the form of a partial salt having a degree of neutralization of at least 40%, specifically at least 50%, more specifically at least 60%. Specifically the binder is provided in the form of a partial salt having a degree of neutralization of no greater than 90%, specifically no greater than 80% and especially no greater than 70%.

Where the active material layer comprises silicon as a high capacity electroactive material, the silicon may be provided as high purity silicon or in the form of an alloy or a compound. High purity forms of silicon comprise at least 90 wt % elemental silicon, specifically at least 95 wt %, more specifically at least 98 wt %, more specifically at least 99 wt %. Examples of high capacity electroactive alloys are well known to a skilled person. Examples of high capacity electroactive silicon compounds that can be included in the active material layer include silicon oxide (SiOx, where x<2) and silicon sulfide (SiSx, wherein x<2).

The active material layer suitably extends over the surface of the current collecting assembly and protrudes beyond the reinforcing structures deposited on the surface of the current collecting substrate. Where the active material layer is applied to a first surface of the current collecting assembly, the first active material layer extends beyond the reinforcing structures of the first assembly.

The first assembly of reinforcing structures of the electrode of the third aspect of the disclosure suitably cover less than 40% of the first surface of the current collecting substrate. A similar configuration is provided for the second assembly of reinforcing structures applied to the second surface of current collecting substrate.

A fourth aspect of the disclosure provides a method of manufacturing an electrode for a lithium ion battery, the method comprising (a) providing a current collecting assembly comprising a conductive current collecting substrate having a first side defining a first surface and a first surface area, a second side defining a second surface and a second surface area and a first arrangement of reinforcing structures comprising a first polymer material disposed on and attached to the first side of the current collecting substrate; (b) forming a first active material layer on the first side of the current collecting substrate thereby to cover the first surface thereof.

Specifically the first active material layer of the fourth aspect of the disclosure covers the first arrangement of reinforcing structures as well as the exposed material of the current collecting substrate.

In a first embodiment of the fourth aspect of the disclosure the first active material layer is suitably formed by depositing a slurry containing the first high capacity active material onto the first surface of the current collecting substrate. Specifically the slurry extends over the first arrangement of reinforcing structures and flows into any recesses defined by intersections between reinforcing structures of the first arrangement and the underlying current collecting substrate; in this way electrical conductivity is provided between the first active material in the first active material layer and the current collecting substrate.

Specifically the slurry comprising the high capacity active material comprises a solvent. Specifically the reinforcing structures disposed on and attached to the surfaces of the current collector are resistant to the solvent.

In a second embodiment of the fourth aspect of the disclosure the current collecting assembly is provided with a second arrangement of reinforcing structures on a second surface of the current collecting substrate. The second arrangement of reinforcing structures may be disposed on and attached to the second surface of the current collecting substrate prior to or after depositing a first layer of active material onto the first surface of the current collecting substrate. Specifically the second arrangement of reinforcing structures is disposed on the second surface of the current collecting substrate and attached thereto before the first active layer is deposited onto the first surface of the current collecting assembly.

In a third embodiment of the fourth aspect of the disclosure a second active material layer comprising a second high capacity active material is disposed on and attached to the second surface of the current collecting assembly. The second surface may or may not include a second arrangement of reinforcing structures prior to the deposition of the second active material layer. Specifically the second surface includes a second arrangement of reinforcing structures and the second active material layer may is disposed over the second surface of the current collecting assembly. The second arrangement of reinforcing structures may be applied to the second side of the current collecting assembly after deposition of the second active material layer.

The method of the fourth aspect of disclosure suitably comprises the step of removing the slurry solvent to form the active material layer on the surface of the current collecting assembly. This can be achieved by drying the electrode at a temperature of greater than 30° C., specifically greater than 40° C., specifically greater than 50° C., more specifically greater than 60° C. Specifically the drying temperature should not exceed 150° C., suitably no more than 120° C., for example 110° C. or less.

The method of the fourth aspect of the disclosure may include the further step of curing the active material layer. This can be achieved by exposing the active material layer to UV light for a period of from 10 to 30 minutes.

The method of the fourth aspect of the disclosure may include the further step of calendering the electrode after formation of the active material layers one or both surfaces of the current collecting assembly.

A fifth aspect of the disclosure provides a cell including an electrode according to the third aspect of the disclosure. Specifically the electrode is an anode.

A sixth aspect of the disclosure provides a battery comprising a cell according to the fifth aspect of the disclosure. Specifically the battery is a lithium ion battery.

A seventh aspect of the disclosure provides a device comprising a battery according to the sixth aspect of the disclosure.

Electrode and Current Collecting Assembly Examples

FIG. 1A is a schematic cross-sectional view of an electrode 100, in accordance with some embodiments. Electrode 100 includes a current collecting substrate 102 and an active material layer 104 disposed over and adhered to current collecting substrate 102. In some embodiments, electrode 100 may also include another active material layer (not shown in FIG. 1A) disposed on the other side of the substrate as further described below with reference to FIGS. 1D and 1E. Current collecting substrate 102 is used to provide mechanical support to one or more active material layers and to conduct an electrical current between the one or more active material layers and other components of the cells, such as cell terminal (not shown in FIG. 1A).

Active material layer 104 includes active material particles 107 and 108 supported by binder on a surface of current collecting substrate 102. In some embodiments, active material layer 104 includes two types of particles, such as particles formed predominantly from high capacity active materials and particles made predominantly from low capacity active materials. In some embodiments, the same particle may include both a low capacity active material and a high capacity active material. For purposes of this document, high capacity active materials are defined as materials having a theoretical capacity of at least about 1000 mAh/g, while low capacity active materials are defined as materials that have a theoretical capacity of less than about 1000 mAh/g. Examples of high capacity active materials include silicon, tin, and germanium, while examples of low high capacity active materials include carbon based materials, such as graphite and hard carbon. In some embodiments, a concentration of the one or more high capacity active materials in an active material layer is at least about 30% by weight, at least about 40% by weight, and even at least about 50% by weight. In addition to binder 106 and active materials particles 107 and 108, active material layer 104 may include conductive additive (e.g., carbon black).

Electrode 100 also includes reinforcing structures 105 disposed over and attached to a surface 103 of current collecting substrate 102. A combination of reinforcing structures 105 and current collecting substrate 102 is referred to as a current collecting assembly. A current collecting assembly may include one or two sets of reinforcing structures. For example, one set may be provided on one side of the current collecting substrate and another set may be provided on the other side of the current collecting substrate. In some embodiments, only one set of reinforcing structures is provided on one side of the current collecting substrate. The other side remains free from reinforcing structures. This other side may still have an active material layer attached to it.

An arrangement of reinforcing structures may comprise one or more sets of reinforcing structures. Where the arrangement comprises two sets of reinforcing structures, the composition of one of the structures is specifically different to the composition of the other of the structures. Such differences include both chemical differences and physical differences such as differences in number average molecular weight or differences in the porosity of the reinforcing structures.

Figure 1B:
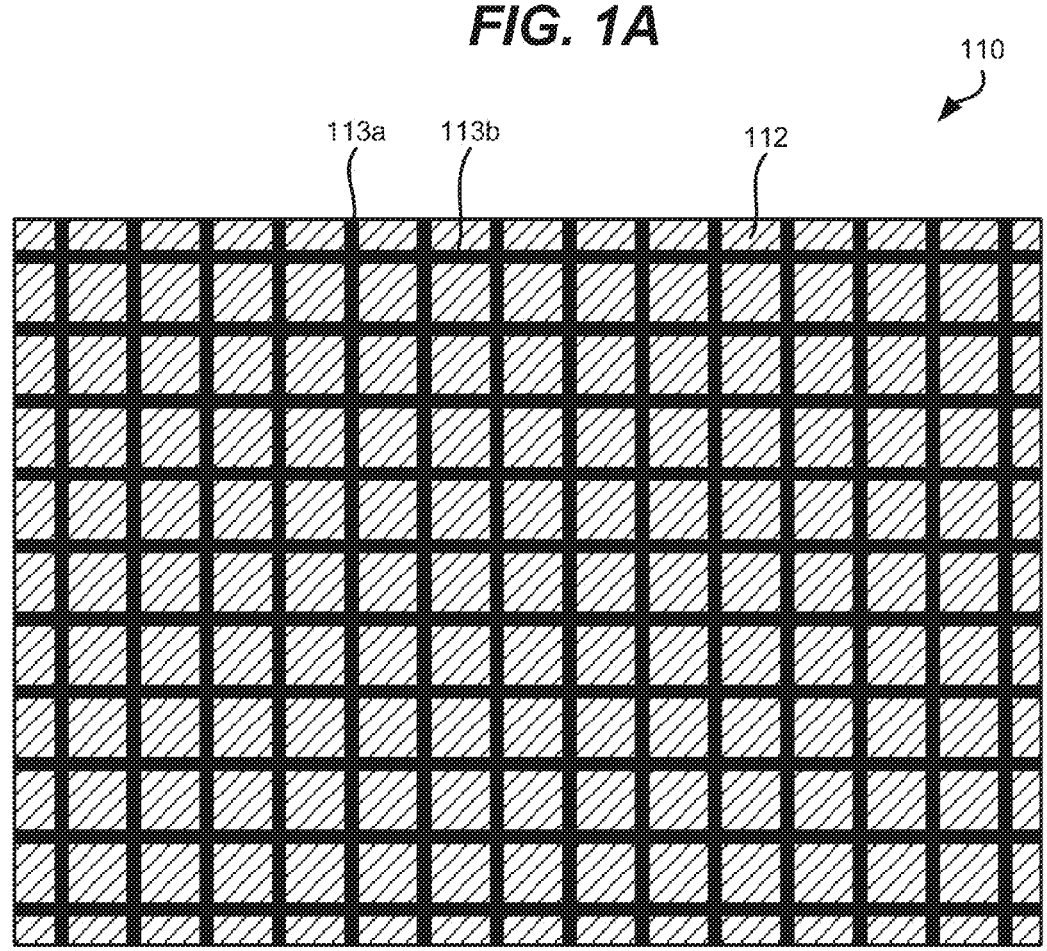
FIG. 1B illustrates a top schematic view of a current collecting assembly, in accordance with some embodiments.

Reinforcing structures in an arrangement comprising one set may be arranged into a grid as, for example, shown in FIG. 1B, or some other arrangements. Specifically, FIG. 1B illustrates a top schematic view of a current collecting assembly 110, in accordance with some embodiments. Reinforcing structures 113a and 113b are arranged into a square grid such that all structures 113a are parallel to each other and all structure 113b are parallel to each and perpendicular to structures 113a. The spacing between structures 113a and between structures 113b is the same. This spacing may be referred to as a pitch. In a rectangular grid, the pitch in one direction is different from the pitch in the different directions. In some embodiments, a subset of the reinforcing structures extend in a first direction and remaining structures remain in a second direction, which forms an angle of between about 30° and 45° with the first direction. In some embodiments, the spacing between structures may be proportional to the length of the electrode or, more specifically, the dimension of the current collecting substrate in this direction.

As shown in FIG. 1B, current collecting assembly 110 has a portion of current collecting substrate 112 exposed. The remaining portion of current collecting substrate 112 is covered by reinforcing structures 113a and 113b. In some embodiments, reinforcing structures 113a and 113b forming a set on the same surface of current collecting substrate 112 cover less than about 40% of the surface or, more specifically, less than 30%, or less than 20% or even less than 10%. The remaining portion of the surface remains exposed and available to make direct contact with an active material layer.

Figure 1C:
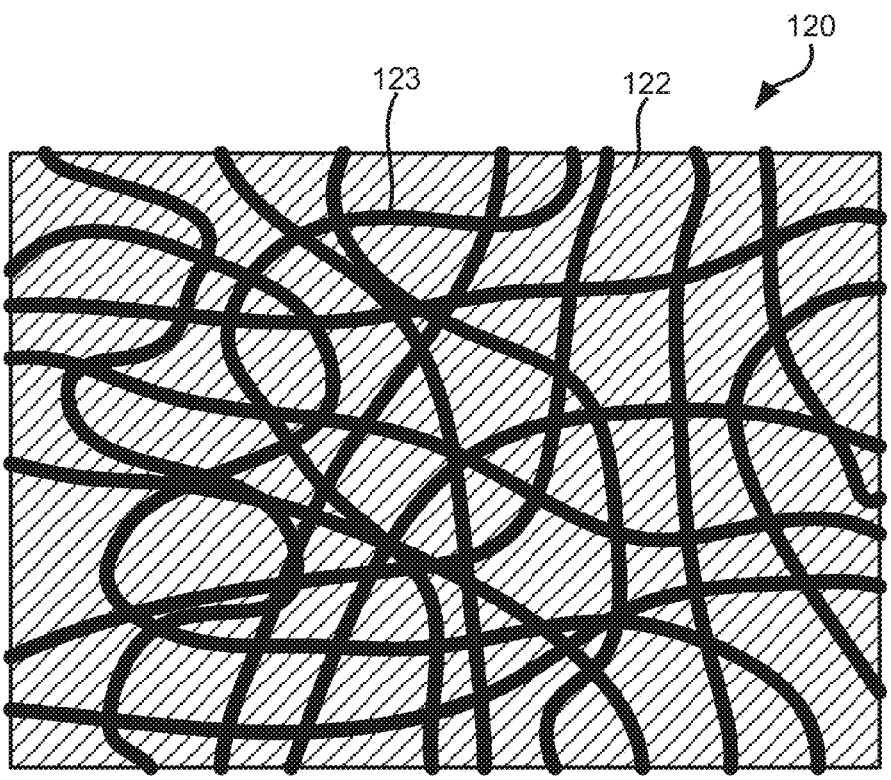
FIG. 1C is a schematic top view of another current collecting assembly, in which reinforcing structures have a random orientation on a surface of current collecting substrate, in accordance with some embodiments.
Figure 1D:
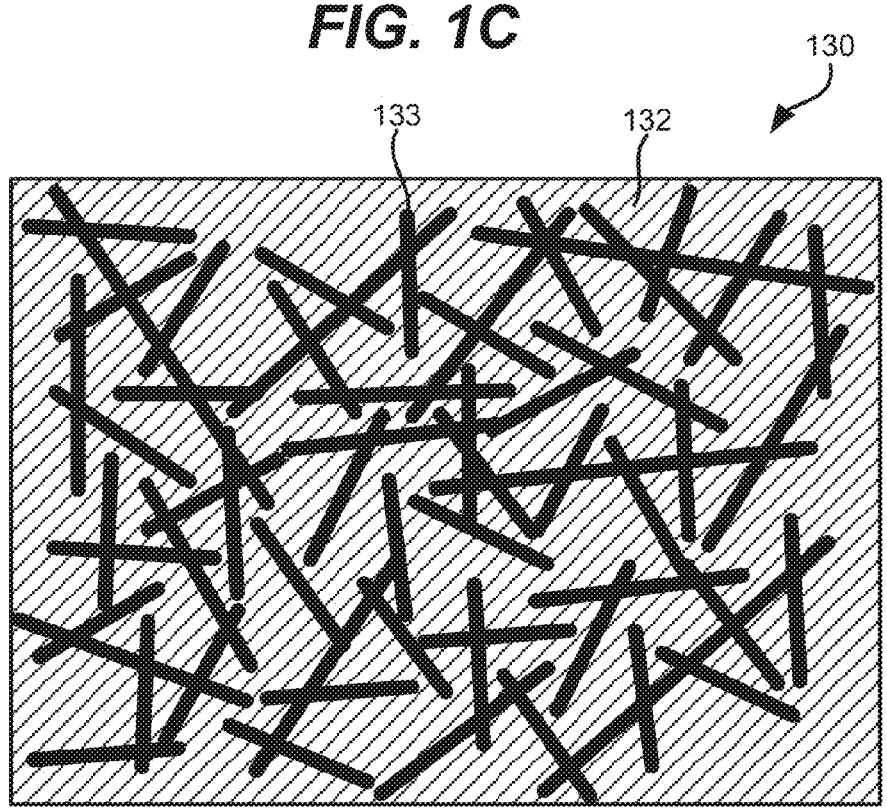
FIG. 1D is a schematic top view of another current collecting assembly having randomly orientated reinforcing structures disposed on a surface of current collecting substrate, in accordance with some embodiments.

FIG. 1C is a schematic top view of another current collecting assembly 120, in which reinforcing structures 123 have a random orientation on a surface of current collecting substrate 122. Reinforcing structures 123 have curved shapes and may be formed for example by electro-spinning or other suitable techniques. FIG. 1D is a schematic top view of another current collecting assembly 130 having randomly orientated reinforcing structures 133 disposed on a surface of current collecting substrate 132.

Figure 1E:
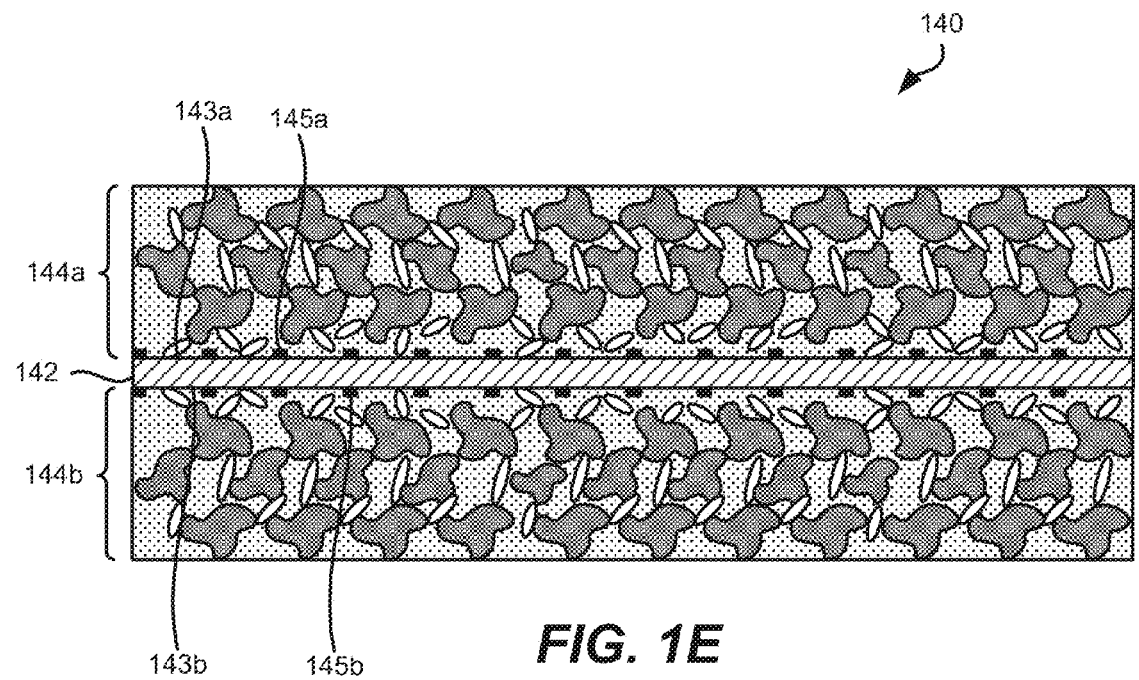
FIG. 1E is a schematic cross-sectional view of an electrode including two active material layers and two arrangements comprising two sets of reinforcing structures, in accordance with some embodiments.

FIG. 1E is a schematic cross-sectional view of an electrode 140 including two active material layers 144a and 144b and two arrangements comprising two sets 145a and 145b of reinforcing structures, in accordance with some embodiments. Each arrangement comprises one set of reinforcing structures. Electrode 140 also includes a current collecting substrate 142 that provides mechanical support for two active material layers 144a and 144b and two arrangements 145a and 145b of reinforcing structures. Specifically, first active material layer 144a and first arrangement 145a of reinforcing structures is supported by first surface 143 of current collecting substrate 142. Reinforcing structures 145a are positioned in between first active material layer 144a and first surface 134a of current collecting substrate 142. A portion of first active material layer 144a protrudes in between reinforcing structures 145a directly interfaces with first surface 134a of current collecting substrate 142. Likewise, second active material layer 144b and second arrangement 145b of reinforcing structures is supported by second surface 143b of current collecting substrate 142.

Figure 1F:
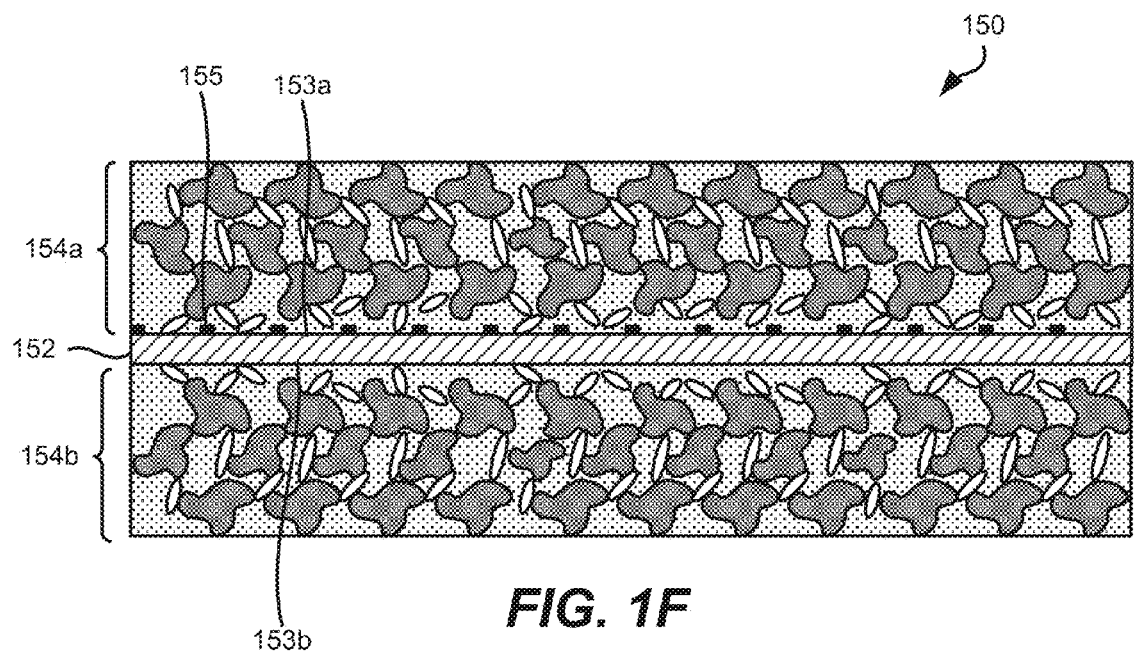
FIG. 1F is a schematic cross-sectional view of another electrode including two active material layers and only one arrangement of reinforcing structures, in accordance with some embodiments.

FIG. 1F is a schematic cross-sectional view of another electrode 150 including two active material layers 154a and 154b and only one arrangement 155 of reinforcing structures, in accordance with some embodiments. Electrode 150 also includes a current collecting substrate 152 that provides mechanical support for two active material layers 154a and 154b and arrangement 155 of reinforcing structures. Specifically, first active material layer 154a and arrangement 155 of reinforcing structures is supported by first surface 153a of current collecting substrate 152. Second surface 153b of current collecting substrate 152 supports only second active material layer 154b and does not support or interfaces with any reinforcing structures. In this example, current collecting substrate 152 is only reinforced on one side.

Figure 1G:
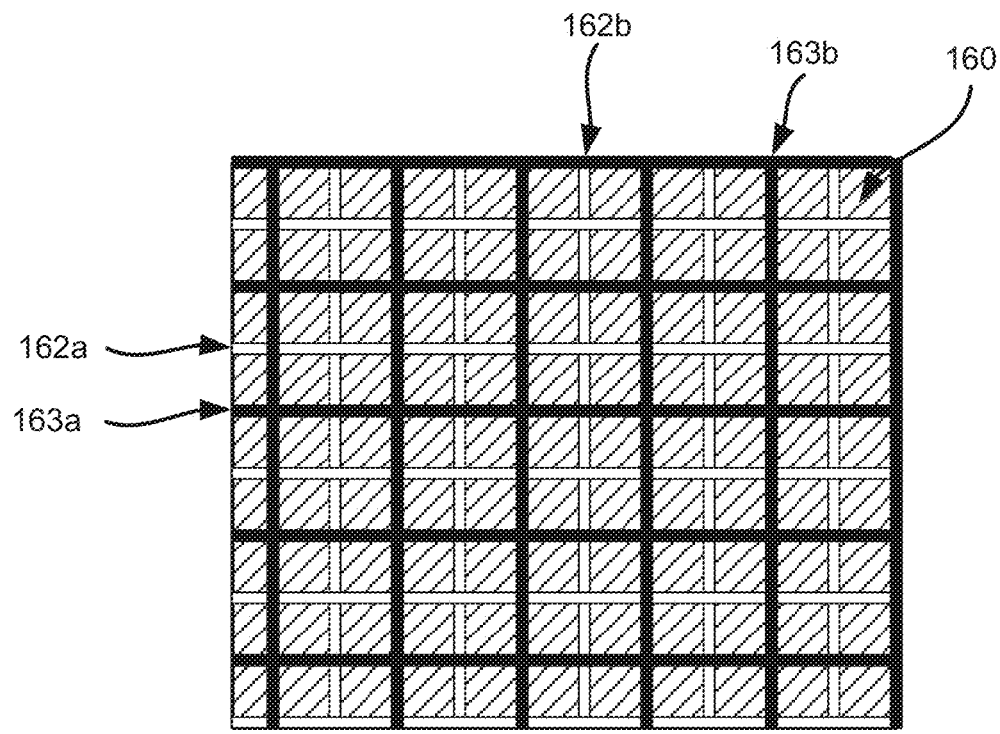
FIG. 1G is a schematic top view of another current collecting assembly Including a first set of reinforcing structures and a second set of reinforcing structures applied to the same surface of a current collecting substrate and arranged into a square grid, in accordance with some embodiments.

FIG. 1G is a schematic top view of another current collecting assembly 160 comprising a first set of reinforcing structures 162 and a second set of reinforcing structures 163 applied to the same surface of a current collecting substrate, in which reinforcing structures 162a, 162b, 163a and 163b are arranged into a square grid such that all structures 162a and 163a are parallel to each other and all structure 162b and 163b are parallel to each and perpendicular to structures 162a and 163a. The spacing between structures 162a and between structures 162b is the same. Specifically the spacing between structures 163a and 163b is the same. Specifically the spacing between structures 162a in one direction is the same as the spacing between structures 163a in the same direction. Similarly the spacing between structures 162b in a direction perpendicular to the direction of structures 162a may be the same as the spacing between structures 163b in the same direction. The polymeric material of the structures 162 is different to the polymeric material of the structures 163. Specifically the polymeric material of structures 162 is strongly adherent to a surface of the current collecting substrate. Specifically the polymeric material of structure 163 is strongly adherent to the active material layer. The spacing between structures of the same composition in one direction may be referred to as a pitch.

Figure 1H:
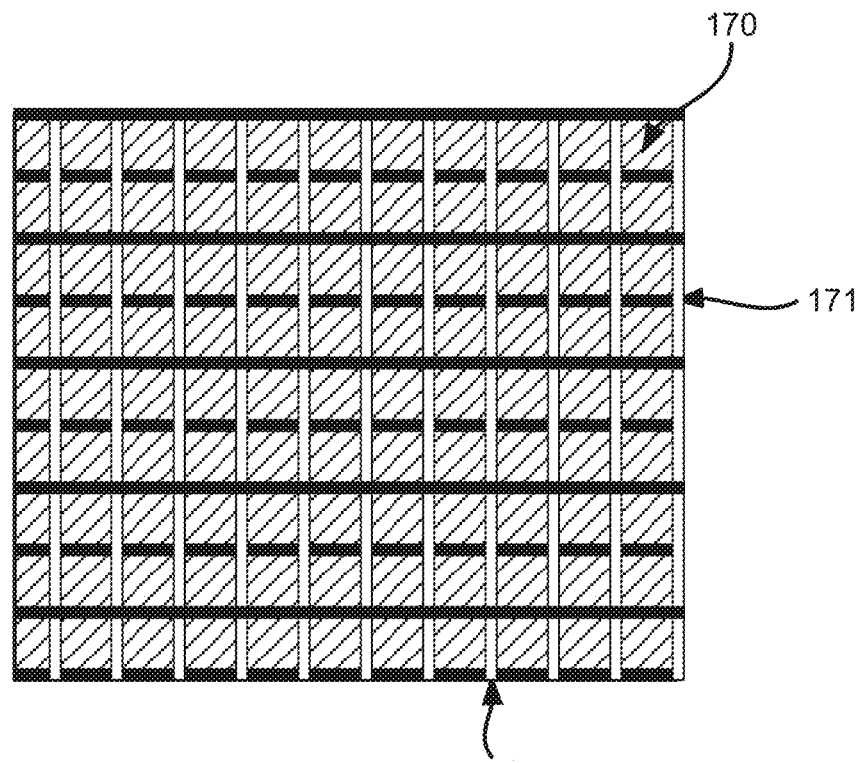
FIG. 1H shows another current collecting assembly including a first set of reinforcing structures and a second set of reinforcing structures, in accordance with some embodiments.

FIG. 1H shows another current collecting assembly 170 comprising a first set of reinforcing structures 171, and a second set of reinforcing structures 172. 171 and 172 may be arranged in a perpendicular configuration as shown.

Figure 2A:
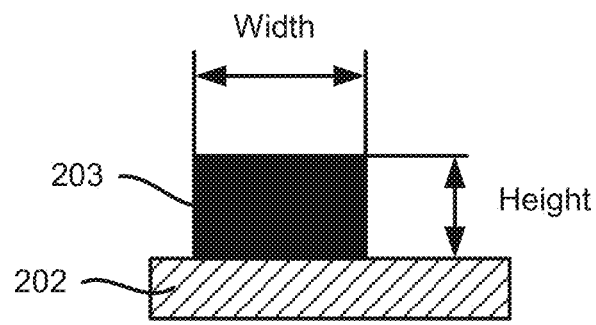
FIG. 2A illustrates a rectangular reinforcing structure disposed on a substrate, in accordance with some embodiments.
Figure 2B:
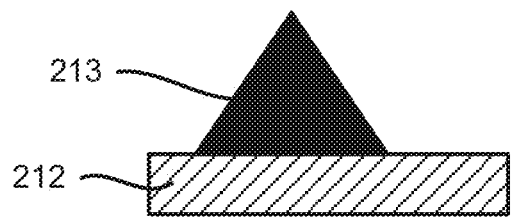
FIG. 2B illustrates a triangular reinforcing structure disposed on a substrate, in accordance with some embodiments.
Figure 2C:
FIG. 2C illustrates a partially oval reinforcing structure disposed on a substrate, in accordance with some embodiments.

Reinforcing structures may have different cross-sectional profiles as, for example, shown in FIGS. 2A-2C. Specifically, FIG. 2A illustrates a rectangular reinforcing structure 203 disposed on substrate 202, in accordance with some embodiments. FIG. 2B illustrates a triangular reinforcing structure 213 disposed on substrate 212, in accordance with some embodiments. Finally, FIG. 2C illustrates a partially oval reinforcing structure 223 disposed on substrate 222, in accordance with some embodiments. It is generally desirable to have a sufficient contact area with the substrate to ensure adequate load transfer between the two structures.

In some embodiments, the width of reinforcing structures is between about 0.5 microns and 50 microns or, more specifically, between about 1 micron and 10 microns. The height of reinforcing structures may be between about 0.5 microns and 50 microns or, more specifically, between about 1 micron and 10 microns. The cross-sectional area of reinforcing structures may be between about 1 square micron and 100 square microns or, more specifically, between about 10 square microns and 100 square microns.

Figure 2D:
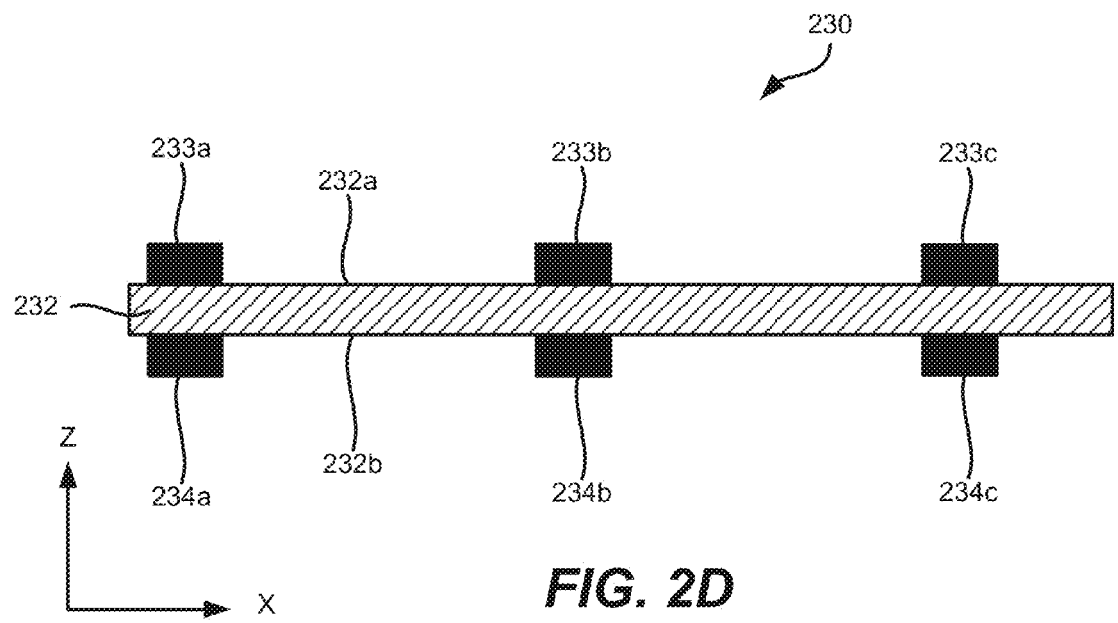
FIG. 2D illustrates a current collecting assembly with reinforcing structures disposed on a first surface of a substrate and aligned with reinforcing structures disposed on a second surface of the substrate, in accordance with some embodiments.
Figure 2E:
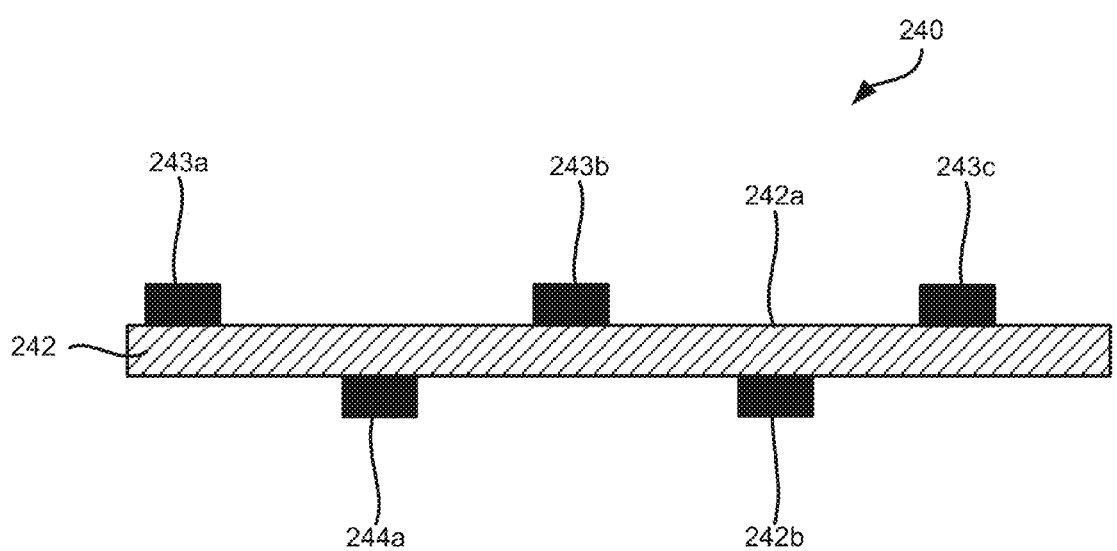
FIG. 2E illustrates a current collecting assembly with reinforcing structures disposed on a first surface of a substrate and additional reinforcing structures disposed on a second surface of the substrate, in accordance with some embodiments.

In some embodiment, reinforcing structures are disposed on both sides of substrate as, for example, shown in FIGS. 2D and 2E. Specifically, FIG. 2D illustrates a current collecting assembly 230 with reinforcing structures 233a-233c disposed on a first surface 232a of substrate 232 and aligned with reinforcing structures 234a-234c disposed on a second surface 232b of substrate 232. It should be noted that the alignment shown herein is in the X direction. In other words, projections of reinforcing structures 233a-233c and reinforcing structures 234a-234c in the Z direction coincide for this cross-section.

FIG. 2E illustrates a current collecting assembly 240 with reinforcing structures 243a-243c disposed on a first surface 242a of substrate 242 and reinforcing structures 244a-244c disposed on a second surface 242b of substrate 242. In this example, reinforcing structures 243a-243c and reinforcing structures 244a-244c are not aligned and instead are shifted with respect to each other in the X direction. In some embodiments, reinforcing structures 243a-243c and reinforcing structures 244a-244c may have the same pitched and may shifted by half of this pitch with respect to each other as, for example, shown in FIG. 2E.

Figure 2F:
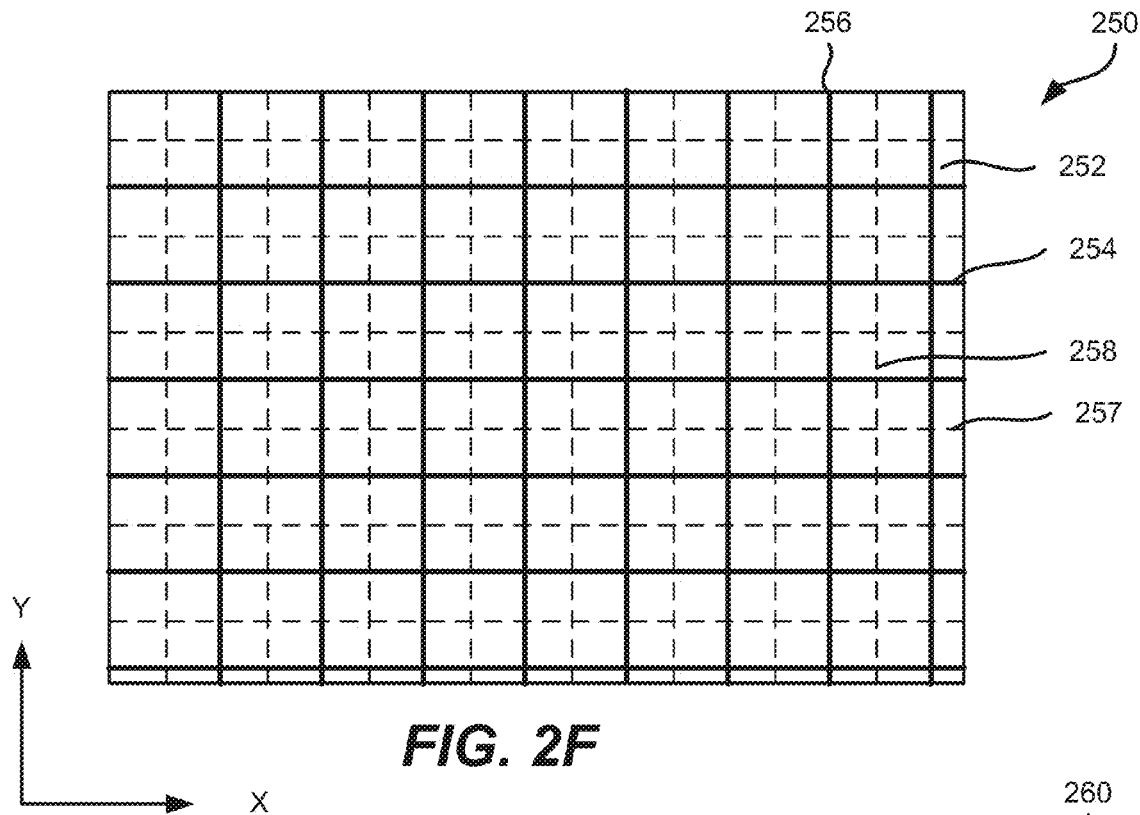
FIG. 2F illustrates a top schematic view of a current collecting assembly including reinforcing structures disposed on one side of a current collecting substrate, in accordance with some embodiments.

FIG. 2F illustrates a top schematic view of a current collecting assembly 250 including reinforcing structures 254 and 256 disposed on one side of a current collecting substrate 252, in accordance with some embodiments. Reinforcing structures 254 extend in the X direction, while reinforcing structures 256 extend in the Y direction thereby forming a square grid on the surface of current collecting substrate 252. In this example, reinforcing structures 254 are substantially perpendicular to reinforcing structures 256. In general, a current collecting assembly can include two or more sets of reinforcing structures disposed on one side of the substrate, such that the structures in each set are substantially parallel to each other. The reinforcing structures in one set may have any angle between 45° and 90° with the reinforce structures of the other set or, more specifically, between about 60° and 90° or even between about 75° and 90°.

Another side of the substrate may have a similar set of reinforcing structures or a different set. One such example is shown in FIG. 2F. Specifically, FIG. 2F illustrates another set of reinforcing structures 258 disposed on the second side of the same current collecting substrate 252. As described above, reinforcing structures 254 and 256 are disposed on the first side of current collecting substrate 252. Reinforcing structures 258 is shown with dashed lines to represent their orientation in this top view. These reinforcing structures 258 also form a square grid along the same X and Y axis as reinforcing structures 254 and 256. Reinforcing structures 258 may have the same cell size of the grid as reinforcing structures 254 and 256. In some embodiments, the size may be different.

FIG. 2F illustrates a top schematic view of a current collecting assembly 250 including reinforcing structures disposed on both sides of a current collecting substrate 252, in accordance with some embodiments. Reinforcing structures 254 and 256 disposed on the front side are shown with solid lines, while reinforcing structures 254 and 256 disposed on the front side are shown with solid lines reinforcing structures 257 and 258 disposed on the back side are shown with dashed lines. Reinforcing structures on one side may be referred to as a set of reinforcing structures. Both sets (i.e., on the front side and the back side) are in the form of square grids with reinforcing structures 254 being perpendicular to 256 and parallel to reinforcing structures 257 (and the X direction). Likewise, reinforcing structures 257 being perpendicular to 258 and parallel to reinforcing structures 254. Reinforcing structures 256 and 258 are parallel to the Y direction.

Figure 2G:
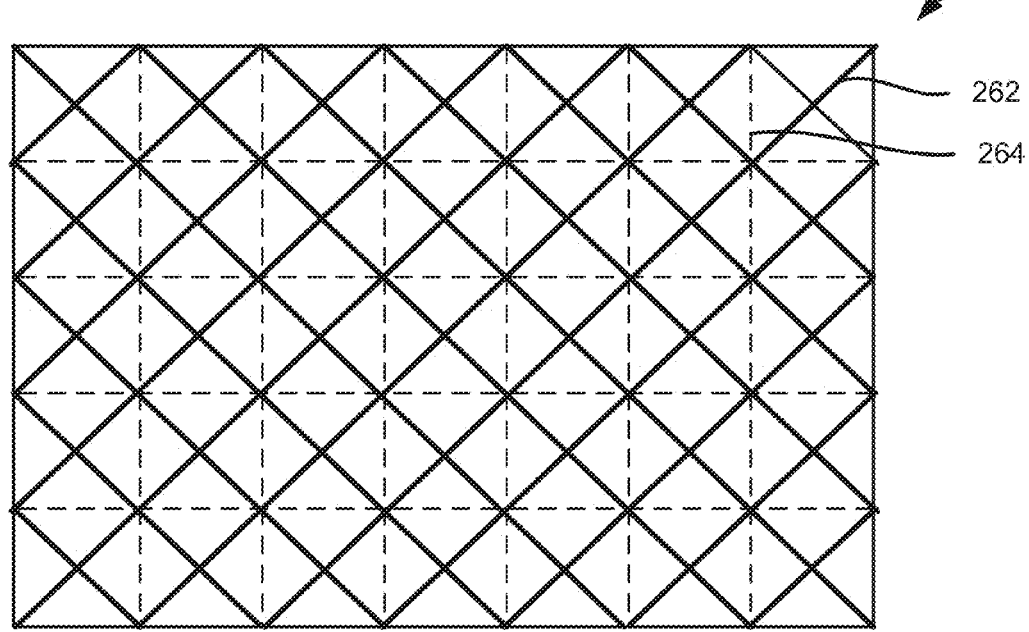
FIG. 2G illustrates the current collecting assembly in which one square grid is rotated relative to the other grid by 45°, in accordance with some embodiments.

The two square grids may have the same pitch in the X and Y directions as, e.g., shown in FIG. 2F. Alternatively, one grid may have a different pitch in one or both of the X and Y directions. For example, FIG. 2G illustrates a current collecting assembly 260 in which grid 262 has larger pitches that grid 264.

Reinforcing structures of arrangement or one set may be aligned with reinforcing structures of another arrangement or set such that one reinforcing structure is projected over another reinforcing structure as described above with reference to FIG. 2D. Alternatively, reinforcing structures of one arrangement or set may be shifted relative to reinforcing structures of another arrangement or set such that one reinforcing structure is not projected over another reinforcing structure as described above with reference to FIG. 2E. FIG. 2F illustrates the current collecting assembly 250 in which one square grid is shifted in two directions, i.e., the X direction and the Y direction, relative to the grid on the other side. FIG. 2G illustrates the current collecting assembly 260 in which one square grid is rotated relative to the other grid by 45°. In some embodiments, two square or, more generally, rectangular grids may be rotated by an angled up to 45° or, more specifically, up to 30°, or even up to 15°.

Examples of Fabrication and Electrochemical Cells

Figure 3:
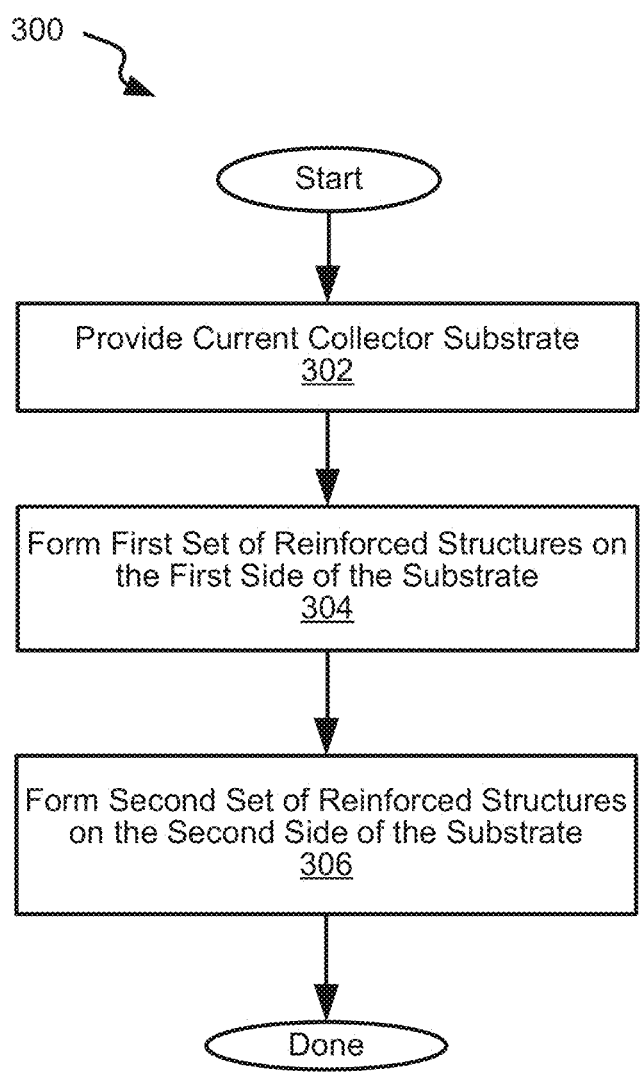
FIG. 3 is a process flowchart corresponding to a method of fabricating a current collecting assembly for use in an electrochemical cell, in accordance with some embodiments.

FIG. 3 is a process flowchart corresponding to a method 300 of fabricating a current collecting assembly for use in an electrochemical cell, in accordance with some embodiments. Method 300 may proceed with providing a current collecting substrate during operation 302. The current collecting substrate may include one or more conductive materials, such as copper, titanium, nickel, iron, aluminum, and the like. In some embodiment, the current collector is a copper coated nickel current collector. The current collecting substrate may be in a form of a foil and may have a thickness of between about 1 micrometer and 100 micrometer or, more specifically, between about 5 micrometers and 30 micrometers. Thicker substrates may be sufficiently strong and, thus, do not need to be reinforced as described herein. Various examples of substrates are described elsewhere in this document.

Method 300 may proceed with forming a first set of reinforcing structures on the first side of the current collecting substrate during operation 304. The reinforcing structures may include one or more polymer materials. Various examples of materials for reinforcing structures, shapes of reinforcing structures, arrangement of reinforcing structures are described elsewhere in this document. For example, reinforcing structures may be arranged into a patterned grid (e.g., square or rectangular grid) or have random orientation.

Forming the first set of reinforcing structures during operation 304 may involve laminating, screen printing, lithographic deposition, spray coating, or electro-spinning. In one example, forming the first set of reinforcing structures involves laminating an initial set of preformed reinforcing structures onto the first side of the current collecting substrate. For example, the initial set of reinforcing structured may be formed from a thermoplastic polymer. The reinforcing structured may be heated during lamination and/or pressed against the first side of the current collecting substrate.

In some embodiments, forming the first set of reinforcing structures during operation 304 involves depositing a solution containing a polymer and a solvent onto the first side of the current collecting substrate. This deposition is followed by evaporating at least a portion of the solvent from the solution. In some embodiments, at least some solvent remains in the reinforcing structures after competing operation 304. Specifically, the first set of reinforcing structures may include at least about 10% of the initial solution after the first set of reinforcing structures is formed.

In some embodiments, the solution used to form reinforcing structures includes oxalic acid. Without being restricted to any particular theory, it is believed that oxalic acid etched the current collecting substrate and, therefore, improves adhesion of the reinforcing structures to the substrate. In some embodiments, the concentration of the oxalic acid in the solution is between about 0.1% by weight and 1% by weight, such as about 0.4% by weight.

In some embodiments, the solution used to form reinforcing structures includes a conductive additive. For example, the solution may include graphite, carbon black, carbon nanotubes, metallic flakes, and the like. The concentration of the conductive additive in the solution may be between about 1% by weight and 50% by weight. In some embodiments, a conductive additive may also improve mechanical properties (e.g., tensile strength) of the reinforcing structures. In general, the solution (and subsequently the reinforcing structures) may include a filler, such as fumed silica, polymer fibers, high-tensile strength fibers, and the like.

In some embodiments, the current collecting substrate includes a mask disposed on the first side of the current collecting substrate prior to forming the first set of reinforcing structures, i.e., prior to operation 304. The mask defines a pattern of the first set of reinforcing structures. This mask is removed after forming the first set of reinforcing structures. In this case, forming the first set of reinforcing structures during operation 304 may proceed with depositing a continuous layer on the first side. Then a portion of this continuous layer is removed by removing the mask, which in turns forms the first set of reinforcing structures.

Method 300 may proceed with forming a second set of reinforced structures on the second side of the substrate during optional operation 306. Various orientations of the second set relative to the first set are described above with reference to FIGS. 2D-2G. The second set of reinforced structures may be formed before any active material layers are formed on the substrate. Alternatively, the second set of reinforced structures may be formed after an active material layer is formed on the first side and over the first set of reinforced structures.

In some embodiments, only one set of reinforced structures is formed on a current collecting substrate. Such assemblies may be used for one-sided electrodes (for ends of stacked cells) or two-sided electrodes. In a one-sided electrode, the only set of reinforced structures and the only active material layer may be formed on the same side or different sides. When an active material layer is formed on a side of a current collecting substrate that is free from reinforced structures (in one sided electrodes or two sided electrodes), this active material layer may be formed before or after the reinforced structures are formed. For one-sided electrodes, the reinforced structure may be formed on the current collector prior to the active material layer to reinforce the interface.

Examples of Fabrication and Electrochemical Cells

Figure 4:
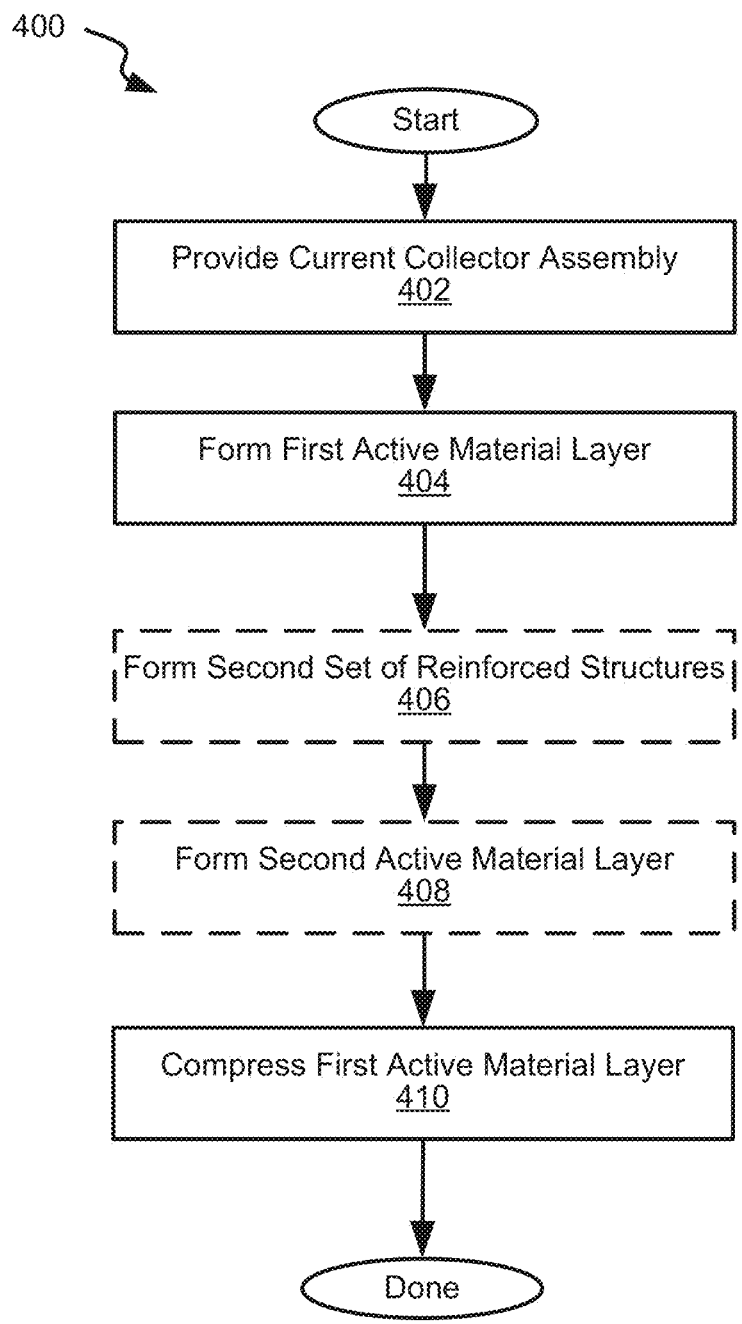
FIG. 4 is a process flowchart corresponding to a method of forming an electrode having a current collecting assembly with reinforced structures, in accordance with some embodiments.

FIG. 4 is a process flowchart corresponding to a method 400 of forming an electrode having a current collecting assembly with reinforced structures, in accordance with some embodiments. Method 400 may commence with providing a current collecting assembly during operation 402. The current collecting assembly includes a current collecting substrate and a first arrangement or set of reinforcing structures disposed on a first side of the current collecting substrate. In some embodiments, the current collecting assembly also includes a second arrangement or set of reinforcing structures disposed on the second side of the current collecting substrate. Alternatively, the second arrangement or set may be formed later or not formed at all. The first side does not include any active material layers. The second side may include an active material layer.

Method 400 then proceeds with forming a first active material layer on the first side of the current collecting substrate and over the first arrangement or set of reinforcing structures during operation 404. This operation may involve depositing a continuous layer of slurry onto the first side of the current collecting substrate and over the first arrangement or set of reinforcing structures. The slurry flows in between the reinforcing structures and contacts an exposed portion of the current collecting. The slurry may include a solvent. The reinforcing structures may be resistant to this solvent. Alternatively, the solvent may soften the reinforced structure and allow some materials in the active material layer to penetrate into the reinforced structures thereby improving adhesion between the active material layer and the reinforced structures.

In some embodiments, method 400 proceeds with forming a second arrangement or set of reinforcing structures on the second side of the current collecting substrate during optional operation 406. It should be noted that operation 406 may be performed after operation 404, i.e., after forming the first active material layer. Alternatively, the arrangement or second set may be a part of the current collecting assembly provided during operation 402 or formed on prior to forming the first active material layer. Furthermore, the electrode may include only one arrangement or set (i.e., the first set) of reinforced structure and the second arrangement or set is not formed or present.

Method 400 may also involve forming a second active material layer on the second side of the current collecting substrate during optional operation 408. In some embodiments, the second active material layer is formed over an arrangement or set of reinforced structures, i.e., a second arrangement or set of reinforcing structures as, e.g., shown in FIG. 1E. Alternatively, the second active material layer is formed on the second side of the substrate that is free from reinforced structures as, e.g., shown in FIG. 1F.

Method 400 may also proceed with compressing the first active material layer during operation 410. The first active material layer is compressed to achieve a desired porosity of this layer. This compressing may also distort the reinforced structures disposed under the first active material layer. Alternatively, the reinforced structures may remain intact.

In some embodiments, the first active material layer includes silicon, tin, and/or germanium. More specifically, the first active material layer may include silicon, graphite, and a binder such that the concentration of silicon in the first active material layer is at least about 30% by weight.

In some embodiments, active material structures used for the first active material layer may be surface treated to improve their adhesion to the binder and other components. In a similar manner, reinforced structures may be surface treated after they are formed on the substrate and prior to deposition of the first active material layer. Surface treatment may be performed by amino-silanization or by poly (amine) adsorption as detailed in pending U.S. patent application Ser. No. 14/093,666.

Figure 5:
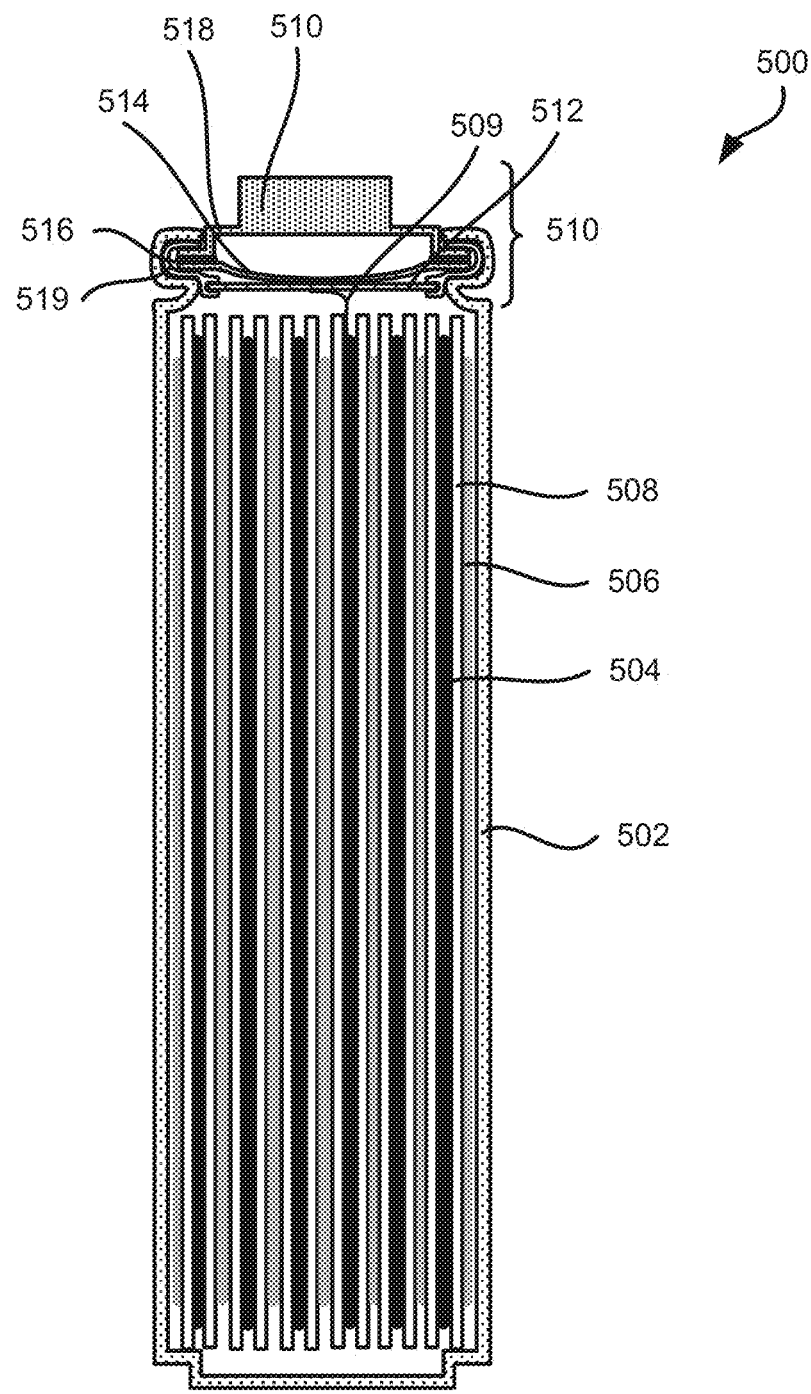
FIG. 5 illustrates a schematic cross-section view of the wound cylindrical cell, in accordance with some embodiments.

FIG. 5 illustrates a schematic cross-section view of the wound cylindrical cell 500, in accordance with some embodiments. Positive electrode 506, negative electrode 504, and separator strips 508 may be wound in to a so-called "jelly roll," which is inserted into a cylindrical case 502. Specifically, the jelly roll includes a spirally wound assembly of positive electrode 506, a negative electrode 504, and two strips of separator 508.

Case 502 may be rigid, in particular for lithium ion cells. Other types of cells may be packed into a flexible, foil-type (polymer laminate) case. A variety of materials can be chosen for case 502. Selection of case materials depend in part on polarity of case 502. If case 502 is connection to positive electrode 506, then case 502 may be formed from titanium 6-4, other titanium alloys, aluminum, aluminum alloys, and 300-series stainless steel. On the other hand, if case 502 is connected to negative electrode 504, then case may be made from titanium, titanium alloys, copper, nickel, lead, and stainless steels. In some embodiments, case 502 is neutral and may be connected to an auxiliary electrode made, for example, from metallic lithium. An electrical connection between case 502 and an electrode may be established by a direct contact between case 502 and this electrode (e.g., an outer wound of the jelly roll), by a tab connected to the electrode and case 502, and other techniques. Case 502 may have an integrated bottom. Alternatively, a bottom may be attached to the case by welding, soldering, crimping, and other techniques. The bottom and the case may have the same or different polarities (e.g., when the case is neutral).

The top of case 502, which is used for insertion of the jelly roll, may be capped with header assembly 510. In some embodiments, header assembly 510 includes a weld plate 512, a rupture membrane 514, a PCT washer 516, header cup 518, and insulating gasket 519. Weld plate 512, rupture membrane 514, PCT washer 516, and header cup 518 are all made from conductive material and are used for conducting electricity between an electrode (negative electrode 504 in FIG. 5) and cell connector 520 (integrated or attached to header cup 518 in FIG. 5). Insulating gasket 519 is used to support the conductive components of header assembly 510 and insulate these components from case 502. Weld plate 512 may be connected to the electrode by tab 509. One end of tab 509 may be welded to the electrode (e.g., ultrasonic or resistance welded), while the other end of tab may be welded to weld plate 512. Centers of weld plate 512 and rupture membrane 514 are connected due to the convex shape of rupture membrane 514. If the internal pressure of cell 500 increases (e.g., due to electrolyte decomposition and other outgassing processes), rupture membrane 514 may change its shape and disconnect from weld plate thereby breaking the electrical connection between the electrode and cell connector 520.

PCT washer 516 is disposed between edges of rupture membrane 514 and edges of header cup 518 effectively interconnecting these two components. At normal operating temperatures, the resistance of PCT washer 516 is low. However, its resistance increases substantially when PCT washer 516 is heated up due to, e.g., heat released within cell 500. PCT washer 516 is effectively thermal circuit breaker that can electrically disconnect rupture membrane 514 from header cup 518 and, as a result, disconnect the electrode from cell connector 520 when the temperature of PCT washer 516 exceeds a certain threshold temperature. In some embodiments, a cell or a battery pack may use a negative thermal coefficient (NTC) safety device in addition to or instead of a PCT device.

Header cup 518 is an external component of header assembly 510. It may be attached to or be integrated with cell connector 520. The attachment or integration may be performed prior to forming header assembly 510 and/or attaching header assembly 510 to case 502. As such, high temperatures, mechanical stresses, and other generally destructive characteristics may be used for this attachment and/or integration.

Types of electrochemical cells are determined by active materials used on positive and negative electrodes as well as composition of electrolyte. Some examples of positive active materials include $Li(M'_xM''_y)O_2$, where M' and M" are different metals (e.g., $Li(Ni_xMn_y)O_2$, $Li(Ni_{1/2}Mn_{1/2})O_2$, $Li(Cr_xMn_{1-x})O_2$, $Li(Al_xMn_{1-x})O_2$), $Li(Co_xM_{1-x})O_2$, where M is a metal, (e.g., $Li(Co_xNi_{1-x})O_2$ and $Li(Co_xFe_{1-x})O_2$), $Li_{1-W}(Mn_xNi_yCo_Z)O_2$, (e.g., $Li(Co_xMn_yNi_{(1-x-y)})O_2$, $Li(Mn_{1/3}Ni_{1/3}Co_{1/3})O_2$, $Li(Mn_{1/3}Ni_{1/3}CO_{1/3}-xMg_X)O_2$), $Li(Mn_{0.4}Ni_{0.4}Co_{0.2})O_2$, $Li(Mn_{0.1}Ni_{0.1}Co_{0.8})O_2$), $Li_{1-W}(Mn_xNi_yCo_{1-2x})O_2$, $Li_{1-W}(Mn_xNi_yCoAl_W)O_2$, $Li_{1-W}(Ni_{x^-}Co^YAl_Z)O_2$ (e.g., $Li(Ni_{0.8}Co_{0.15}Al_{0.05})O_2$), $Li_{1-W}(Ni_{x^-}Co_YM_Z)O_2$, where M is a metal, $Li_{1-W}(Ni_xMn_yM_Z)O_2$, where M is a metal, $Li(Ni_{x-y}Mn_yCr_{2-x})O_4$, $LiM'M''_2O_4$, where M' and M" are different metals (e.g., $LiMn_{2-Y-Z}Ni_YO_4$, $LiMn_{2-Y-Z}Ni_YLi_ZO_4$, $LiMn_{1.5}Ni_{0.5}O_4$, $LiNiCuO_4$, $LiMn_{1-x}Al_xO_4$, $LiNi_{0.5}Ti_{0.5}O_4$, $Li_{1.05}Al_{0.1}Mn_{1.85}O_{4-z}F_z$, $Li_2MnO_3$) $Li_xV_yO_z$, e.g., $LiV_3O_8$, $LiV_2O_5$, and $LiV_6O_{13}$, LiMPO4 where M is a metal; lithium iron phosphate ($LiFePO_4$) is a common example. It is both inexpensive and has high stability and safety, because the relatively strong phosphate bonds tend to keep the oxygen in the lattice during overcharge, but has poor conductance and require substantial amounts of conductive additives, $LiM_xM''_{1-x}PO_4$ where M' and M" are different metals (e.g. $LiFePO_4$), $LiFe_xM_{1-x}PO_4$, where M is a metal, $LiVOPO_4Li_3V_2(PO_4)_3$, $LiMPO_4$, where M is a metal such as iron or vanadium. Further, a positive electrode may include a secondary active material to improve charge and discharge capacity, such as $V_6O_{13}$, $V_2O_5$, $V_3O_8$, $MoO_3$, $TiS_2$, $WO_2$, $MoO_2$, and $RuO_2$.

The selection of positive electrode materials depends on several considerations, such as cell capacity, safety requirements, intended cycle life, etc. Lithium cobalt oxide (LiCoO$_2$) may be used in smaller cells that require higher gravimetric and/or volumetric capacities, such as portable electronics and medical devices. Cobalt may be partially substituted with Sn, Mg, Fe, Ti, Al, Zr, Cr, V, Ga, Zn, or Cu. Certain materials, such as lithium nickel oxide (LiNiO$_2$), may be less prone to thermal runaway. Other materials provide substantial cost advantage, such as lithium manganese oxide (LiMnO$_2$). Furthermore, lithium manganese oxide has a relatively high power density because its three-dimensional crystalline structure provides more surface area, thereby permitting more ion flux between the electrodes.

Active materials may be deposited as layers on conductive substrates for delivering electrical current between the active materials and cell terminals. Substrate materials may include copper and/or copper dendrite coated metal oxides, stainless steel, titanium, aluminum, nickel (also used as a diffusion barrier), chromium, tungsten, metal nitrides, metal carbides, carbon, carbon fiber, graphite, graphene, carbon set, conductive polymers, or combinations of above including multi-layer structures. In some embodiments, a current collector substrate is copper coated nickel. The substrate material may be formed as a foil, films, set, laminate, wires, tubes, particles, multi-layer structure, or any other suitable configurations. In one example, a substrate is a stainless steel foil having thickness of between about 1 micrometer and 50 micrometers. In other embodiments, a substrate is a copper foil with thickness of between about 5 micrometers and 30 micrometers. In yet another embodiment, a substrate is an aluminum foil with thickness of between about 5 micrometers and 50 micrometers.

In some embodiments, a separator material may include a fabric woven from fluoro-polymeric fibers of poly(ethylene-co-tetrafluoroethylene) (PETFE) and poly(ethylenechloro-co-trifluoroethylene) used either by itself or laminated with a fluoropolymeric microporous film. Moreover, a separator materials may include, polystyrenes, polyvinyl chlorides polypropylene, polyethylene (including LDPE, LLDPE, HDPE, and ultra high molecular weight polyethylene), polyamides, polyimides, polyacrylics, polyacetals, polycarbonates, polyesters, polyetherimides, polyimides, polyketones, polyphenylene ethers, polyphenylene sulfides, polymethylpentene, polysulfones non-woven glass, glass fiber materials, ceramics, a polypropylene membrane commercially available under the designation CELGARD from Celanese Plastic Company, Inc. in Charlotte, N.C., USA, as well as Asahi Chemical Industry Co. in Tokyo, Japan, Tonen Corporation, in Tokyo, Japan, Ube Industries in Tokyo, Japan, and Nitto Denko K.K. in Osaka, Japan. In one embodiment, a separator includes copolymers of any of the foregoing, and mixtures thereof.

A typical separator has the following characteristic: air resistance (Gurley number) of less than about 800 seconds, or less than about 500 seconds in a more specific embodiment; thickness of between about 5 µm and 500 µm, or in specific embodiment between about 10 µm and 100 µm, or more specifically between about 10 µm and 30 µm; pore diameters ranging from between about 0.01 µm and 5 µm or more specifically between about 0.02 µm and 0.5 µm; porosity ranging from between about 20% and 85%, or more specifically, between about 30% and 60%.

The electrolyte in lithium ions cells may be liquid, solid, or gel. Lithium ion cells with the solid electrolyte are also referred to as a lithium polymer cells. A typical liquid electrolyte includes one or more solvents and one or more salts, at least one of which includes lithium. During the first charge cycle (sometimes referred to as a formation cycle), the organic solvent in the electrolyte can partially decompose on the negative electrode surface to form a solid electrolyte interphase layer (SEI layer). The interphase is generally electrically insulating but ionically conductive, allowing lithium ions to pass through. The interphase also prevents decomposition of the electrolyte in the later charging sub-cycles.

Some examples of non-aqueous solvents suitable for some lithium ion cells include the following: cyclic carbonates (e.g., ethylene carbonate (EC), propylene carbonate (PC), butylene carbonate (BC) and vinylethylene carbonate (VEC)), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitrites (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), and organic compounds containing an S=O group (e.g., dimethyl sulfone and divinyl sulfone), and combinations thereof Examples of solvents that may be present in the initial electrolyte include cyclic carbonates (e.g., ethylene carbonate (EC) and propylene carbonate (PC)), linear carbonates (e.g., dimethyl carbonate (DMC), diethyl carbonate (DEC), and ethylmethyl carbonate (EMC)), fluorinated versions of the cyclic and linear carbonates (e.g., monofluoroethylene carbonate (FEC)). Furthermore, non-carbonate solvents, such as sulfones, nitriles, dinitriles, carboxylates, and ethers, may be used.

Non-aqueous liquid solvents can be employed in combination. Examples of the combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In one embodiment, a cyclic carbonate may be combined with a linear ester. Moreover, a cyclic carbonate may be combined with a lactone and a linear ester. In a specific embodiment, the ratio of a cyclic carbonate to a linear ester is between about 1:9 to 10:0, specifically 2:8 to 7:3, by volume.

A salt for liquid electrolytes may include one or more of the following: LiPF$_6$, LiBF$_4$, LiClO$_4$ LiAsF$_6$, LiN(CF$_3$SO$_2$)$_2$, LiN(C$_2$F$_5$SO$_2$)$_2$, LiCF$_3$SO$_3$, LiC(CF$_3$SO$_2$)$_3$, LiPF$_4$(CF$_3$)$_2$, LiPF$_3$(C$_2$F$_5$)$_3$, LiPF$_3$(CF$_3$)$_3$, LiPF$_3$(iso-C$_3$F$_7$)$_3$, LiPF$_5$(iso-C$_3$F$_7$), lithium salts having cyclic alkyl groups (e.g., (CF$_2$)$_2$(SO$_2$)$_{2x}$Li and (CF$_2$)$_3$(SO$_2$)$_{2x}$Li), and combination of thereof. Common combinations include LiPF$_6$ and LiBF$_4$, LiPF$_6$ and LiN(CF$_3$SO$_2$)$_2$, LiBF$_4$ and LiN(CF$_3$SO$_2$)$_2$.

In one embodiment the total concentration of salt in a liquid non-aqueous solvent (or combination of solvents) is at least about 0.3 M; in a more specific embodiment, the salt concentration is at least about 0.7M. The upper concentration limit may be driven by a solubility limit or may be no greater than about 2.5 M; in a more specific embodiment, no more than about 1.5 M.

Example—Preparation of Hybrid Cell

A dispersion comprising 10±2% of a conductive carbon composition in water was prepared. Next an aqueous solution of carboxymethylcellulose (CMC) was prepared; where the weight average molecular weight of the CMC is 350,000, the aqueous solution comprises 2 to 4 wt % of this polymer. Where the weight average molecular weight of CMC is 500,000 the aqueous solution comprises 2 wt % of the polymer. The aqueous solution of CMC was mixed with the conductive carbon slurry. Graphite was added to the mixture and the resulting slurry was stirred twice using a Thinky mixer for 10 minutes at 2000 rpm on each occasion. The mixture was filtered to remove agglomerates.

A slurry of the high capacity active material (5 wt %) in water was prepared using an ultrasonic bath for 20 seconds. Styrene butadiene rubber (SBR) was added to the slurry of active material and stirred using magnetic stirring for 1 hour at 60 rpm.

The CMC containing slurry was mixed with the SBR/active slurry for 1 hour at 60 rpm using magnetic stirring to give a solution in which the weight ratio of silicon:graphite:binder is of the order of 1.6:6.4:1. The slurry has a shear viscosity of between 2.3 and 10 Pa·s at a 20 $s^{-1}$ shear rate. Mixtures containing 1 part by weight of a conductive carbon may also be prepared. Immediately on completion of mixing, the resulting coating mixture is applied to a surface of the current collecting substrate to give a coating weight of 30±2 gsm. The resulting coating is dried at 60° C. for 10 minutes followed by a further 12 hours at 110° C. under a dynamic vacuum. It will be appreciated that the ideal solids content of the final slurry will depend on the nature of the graphite and the high capacity active material. A solids content of 30 to 47% is suitable.

Experimental Results

Figure 6A:
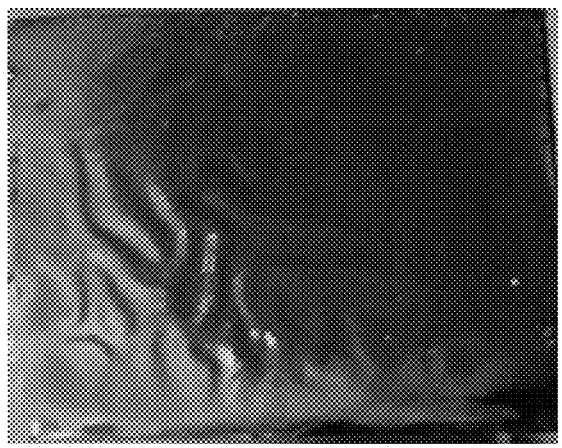
FIG. 6A illustrates a photo of an electrode after cycling fabricated with a copper foil and a loading of the active material of 1.4 g/cm3.
Figure 6B:
FIG. 6B illustrates a photo of an electrode similar to the electrode shown in FIG. 6A, but constructed with a nickel foil.
Figure 6C:
FIG. 6C illustrates a photo a photo of an electrode after cycling fabricated with a nickel foil and a loading of the active material of 1.7 g/cm3.

A set of experiments was conducted to determine distortion of the electrode using different substrates after cycling. Reinforced structures were not used in this experiment. FIG. 6A illustrates a photo of an electrode after cycling fabricated with a copper foil and a loading of the active material of 1.4 g/cm3. FIG. 6B illustrates a photo of a similar electrode constructed with a nickel foil. The loading of the active material was also 1.4 g/cm3 in this electrode. The electrode assembled with the nickel foil showed fewer wrinkles on its surface than the electrode assembled with the copper foil because of the high tensile strength of nickel in comparison to copper. However, even the nickel foil was not able to withstand forces generates using a thicker active materials layer in an electrode. FIG. 6C illustrates a photo a photo of an electrode after cycling fabricated with a nickel foil and a loading of the active material of 1.7 g/cm3. The wrinkles are clearly visible on the surface of this electrode. Addition of reinforced structures is believed to improve mechanical robustness of the electrodes.

Figure 7:
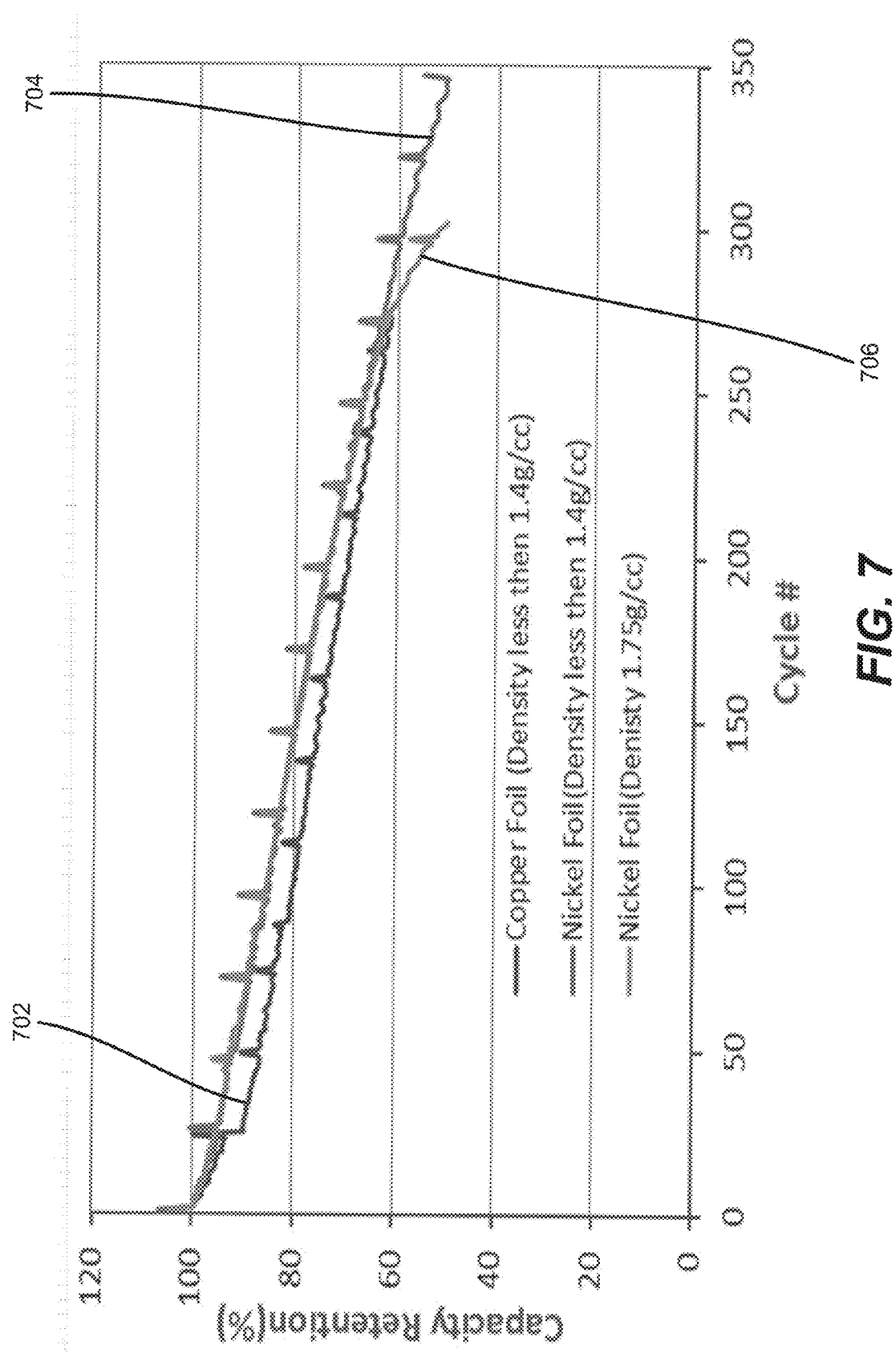
FIG. 7 illustrates cycle data for cells assembled with electrodes shown in FIGS. 6A-6C.

Electrodes similar to the ones illustrated in FIGS. 6A-6C were used to fabricate cells subjected to cycle life testing. The cycle data for these cells is presented in FIG. 7. Specifically, line 702 corresponds to a cell assembled with the electrode having a copper foil and a loading of the active material of 1.4 g/cm$^3$. Line 704 corresponds to a cell assembled with the electrode having a nickel foil and a loading of the active material of 1.4 g/cm$^3$. Line 706 corresponds to a cell assembled with the electrode having a nickel foil and a loading of the active material of 1.7 g/cm$^3$. After 250 cycles, the cell with 1.7 g/cm$^3$ loading on the nickel foil electrode showed a drop in the capacity, which was due to the brittleness of the foil. The cells with the copper foil also exhibited wrinkles, which added extra thickness to each layer thereby increasing the total volume of the cell and lowering the cell energy density.

Conclusion

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A current collecting assembly for use in an electrochemical cell, the current collecting assembly comprising:
   a current collecting substrate having a first side and a second side,
   the first side defining a first surface,
   the second side defining a second surface,
   each of the first surface and the second surface defining a surface area;
   a first assembly of reinforcing structures disposed on and attached to the first side of the current collecting substrate,
   wherein the current collecting substrate comprises a conductive material,
   wherein the first assembly of reinforcing structures comprises a first set of reinforcing structures,
   the first set of reinforcing structures comprising a first polymer material,
   whereby the first assembly of reinforcing structures mechanically reinforces the current collecting substrate; and
   a second assembly of reinforcing structures disposed on and attached to the second surface of the current collector,
   wherein the second assembly of reinforcing structures comprises a second set of reinforcing structures comprising a second polymer material different from the first polymer material, and
   wherein the second assembly of reinforcing structures mechanically reinforces the current collecting substrate.

2. A current collecting assembly according to claim 1, wherein the first assembly of reinforcing structures extends over the first surface of the current collecting substrate and covers less than 40% of a surface area of the first surface.

3. A current collecting assembly according to claim 1, wherein the first polymer material comprises one or more polymers selected from group consisting of polyaniline, polypyrrole, polyparaphenylene, polyparaphenylene sulphide, polyparavinylene, polythiophene, poly paraphenylene terephthalamide, nylon, polyisothionaphthalene, and polyacrylonitrile.

4. A current collecting assembly according to claim 1, wherein the position of the reinforcing structures in the second assembly of reinforcing structures coincides with the position of the reinforcing structures of the first assembly of reinforcing structures.

5. A current collector assembly according to claim 4, wherein the reinforcing structures of the first assembly of reinforcing structures and the second assembly of reinforcing structures are arranged into rectangular grids having corners and rectangular elements each identified with four corners, and wherein the corners of the first assembly of reinforcing structures coincides with centers of the rectangular elements of the second assembly of reinforcing structures.

6. A method of forming a current collecting assembly for use in an electrochemical cell, the method comprising:
providing a current collecting substrate,
the current collecting substrate comprising a conductive material and having a first side and a second side,
the first side defining a first surface,
the second side defining a second surface,
each of the first surface and the second surface defining a surface area; and
forming a first assembly of reinforcing structures on the first side of the current collecting substrate;
wherein the first assembly of reinforcing structures comprises a first set of reinforcing polymers,
wherein the first set of reinforcing polymers comprises a first polymer material,
whereby the first assembly mechanically reinforces the current collecting substrate,
wherein the current collecting substrate comprises a mask disposed on the first surface of the current collecting substrate prior to forming the first set of reinforcing structures on the first surface, and
wherein the mask defines a pattern of the first set of reinforcing structures, and
wherein the mask is removed to form the first set of reinforcing structures.

7. An electrode for an electrochemical cell, the electrode comprising:
a current collecting assembly,
the current collecting assembly comprising a conductive current collecting substrate having a first side and a second side,
the first side defining a first surface,
the second side defining a second surface,
the current collecting assembly further comprising a first assembly of reinforcing structures comprising a first set of reinforcing structures comprising a first polymer material disposed on and attached to the first side of the current collecting substrate; and
a first active material disposed on and attached to the first side of the current collecting substrate;
wherein the first active material is disposed over and attached to the first assembly of reinforcing structures,
wherein the first active material comprises at least 30 wt % of a high capacity electroactive material selected from the group consisting of silicon, tin, and germanium and having a capacity of at least 1000 mAh/g, and
wherein the first active material protrudes between reinforcing structures of the first assembly of reinforcing structures and forms electrical and mechanical connections with at least a portion of the first side of the current collecting substrate not covered by the first assembly of reinforcing structures.

8. An electrode according to any one of claim 7, wherein the first active material further comprises graphite.

9. An electrode according to claim 7, wherein the high capacity electroactive material comprises a material selected from the group consisting of a silicon oxide, a silicon carbide, and a silicon sulfide.

10. An electrode according to claim 7, wherein the high capacity electroactive material is in a form selected from the group consisting of particles, pillared particles, porous particles, porous particle fragments, fibers, flakes, ribbons, and a combination thereof.

11. An electrode according to claim 10, wherein the high capacity electroactive material is in a form selected from the group consisting of particles, pillared particles, porous particles and is characterized by a $D_{50}$ diameter of at least 1 µm.

12. An electrode according to claim 10, wherein the high capacity electroactive material is in a form selected from the group consisting of particles, pillared particles, porous particles and is characterized by a $D_{50}$ diameter of no more than 40 µm.

13. An electrode according to claim 7, further comprising a conductive additive selected from the group consisting of carbon black, ketjen black, acetylene black, graphite, fullerene, graphene, vapor grown carbon fibers, carbon nanotubes, and metal fibers.

14. An electrode according to claim 7, wherein the high capacity electroactive material comprises silicon.

15. An electrode according to claim 7, wherein the high capacity electroactive material comprises a silicon alloy.

16. An electrode according to claim 7, wherein the first active material is provided in the form of a layer disposed on and attached to the first surface of the current collecting assembly.

17. An electrode according to claim 16, wherein the layer is a continuous layer extending over an entire surface of the current collecting assembly.

18. An electrode according to claim 7, further comprising a second active material disposed upon and attached to the second surface of the current collecting substrate.

19. An electrode according to claim 18, wherein the second assembly of reinforcing structures further comprises a fourth set of reinforcing structures comprising a fourth polymer material disposed upon and attached to the second side of the current collecting substrate, wherein the fourth set of reinforcing structures intersects with the second set of reinforcing structures.

20. An electrode according to claim 7, wherein the first polymer material comprises one or more polymers selected from polyaniline, polypyrrole, polyparaphenylene, polyparaphenylene sulphide, polyparavinylene, polythiophene, Kevlar, nylon, polyisothionaphthalene or polyacrylonitrile.

21. An electrode according to claim 7, wherein the first assembly of reinforcing polymer structures comprises a third set of reinforcing structures, wherein the third set of reinforcing structures comprises a third polymer material.

* * * * *